United States Patent
Cliffe et al.

(10) Patent No.: US 12,549,447 B1
(45) Date of Patent: Feb. 10, 2026

(54) PROCESS IMPROVEMENTS FOR REGION BUILDS FOR CLOUD NETWORKS

(71) Applicant: Oracle International Corporation, Redwood Shores, CA (US)

(72) Inventors: Owen Christopher Cliffe, Bath (GB); Michel Belleau, L'Ange-Gardien (CA); Igor Vasilev, Ottawa (CA); Siyuan Peng, Kirkland, WA (US); Kenneth Richard Fox, Redwood City, CA (US); William Thomas Price, Weston-Super-Mare (GB)

(73) Assignee: Oracle International Corporation, Redwood Shores, CA (US)

( * ) Notice: Subject to any disclaimer, the term of this patent is extended or adjusted under 35 U.S.C. 154(b) by 14 days.

(21) Appl. No.: 18/797,274

(22) Filed: Aug. 7, 2024

(51) Int. Cl.
*H04L 41/12* (2022.01)
*G06F 16/901* (2019.01)

(52) U.S. Cl.
CPC .......... *H04L 41/12* (2013.01); *G06F 16/9024* (2019.01)

(58) Field of Classification Search
None
See application file for complete search history.

(56) References Cited

U.S. PATENT DOCUMENTS

| | | | |
|---|---|---|---|
| 11,870,647 B1 * | 1/2024 | Zhang | H04L 41/5051 |
| 12,190,144 B1 * | 1/2025 | Featonby | H04L 67/568 |
| 12,405,836 B1 * | 9/2025 | Sathe | G06F 9/5011 |
| 2020/0059420 A1 * | 2/2020 | Abraham | H04L 41/0843 |
| 2022/0398078 A1 * | 12/2022 | Segler | G06F 8/30 |

OTHER PUBLICATIONS

U.S. Appl. No. 18/076,238, filed Dec. 6, 2022.
U.S. Appl. No. 18/098,617, filed Jan. 18, 2023.
U.S. Appl. No. 18/163,219, filed Feb. 1, 2023.
U.S. Appl. No. 18/163,266, filed Feb. 1, 2023.

* cited by examiner

*Primary Examiner* — Mohamed Ibrahim
(74) *Attorney, Agent, or Firm* — Kilpatrick Townsend & Stockton LLP

(57) ABSTRACT

Techniques disclosed herein pertain to region building for cloud networks and, particularly, for region building process improvements. The techniques include accessing first configuration instructions for building a physical region of a cloud service provider and executing the first configuration instructions. Executing the first configuration instructions causes a first graph that includes nodes to be traversed. A second graph for replacing the first graph can be selected from among candidate graphs. The candidate graphs are generated by reducing an execution time associated with a node of the nodes of the first graph. Second configuration instructions that include instructions for traversing the second graph are generated and executed. Executing the second configuration instructions causes a second graph that includes the nodes to be traversed.

20 Claims, 14 Drawing Sheets

PROCESS IMPROVEMENTS FOR REGION BUILDS FOR CLOUD NETWORKS

BACKGROUND

Today, cloud infrastructure services utilize many individual services to build a data center (e.g., to bootstrap various resources in a data center of a particular geographic region). In some examples, a region is a logical abstraction corresponding to a localized geographical area in which one or more data centers are (or are to be) located. Building a data center may include provisioning and configuring infrastructure resources and deploying code to those resources (e.g., for a variety of services). The operations for building a data center may be collectively referred to as performing a "region build." Any suitable number of data centers may be included in a region and therefore a region build may include operations for building multiple data centers. As resources are bootstrapped to the data center, various capabilities may be published to indicate their availability.

Conventional tools for building a region require significant manual effort as bootstrapping operations for one service may depend on other functionality and/or services of the region which may not yet be available. For example, to bootstrap an application, both an object storage application and a cloud identity service may first need to be available in the region. However, in some instances, without the implementation of such dependent resources, the application may be unable to be bootstrapped or have its capabilities published. As the number of service teams and regions grows, the tasks performed for orchestrating provisioning and deployment drastically increase. Substantially relying on manual efforts for bootstrapping services and/or building regions is time intensive, incurs risks, and may not scale well.

BRIEF SUMMARY

Techniques disclosed herein pertain to region building for cloud networks and, particularly, for region build process improvements.

In some embodiments, a computer-implemented method includes: accessing, by a computing system, first configuration instructions for building a physical region of a cloud service provider, wherein the first configuration instructions include instructions for traversing a first graph includes a set of nodes; executing, by the computing system, the first configuration instructions, wherein executing the first configuration instructions includes traversing the first graph; replacing, by the computing system, the first graph with a second graph includes the set of nodes by: identifying a set of paths for traversing the first graph, wherein each path of the set of paths starts at a start node of the set of nodes and ends at an end node of the set of nodes and includes a node of the set of nodes that is located between the start node and the end node; identifying a critical path from among the set of paths, the critical path representing a minimum time needed to traverse the first graph from the start node to the end node; generating a plurality of candidate graphs from the first graph, wherein each candidate graph of the plurality of candidate graphs includes the node, wherein an execution time associated with the node in a respective candidate graph of the plurality of candidate graphs is different from an execution time associated with the node in other candidate graphs of the plurality of candidate graphs; selecting a candidate graph from the plurality of candidate graphs; and setting the candidate graph as the second graph; and generating, by the computing system, second configuration instructions by modifying the first configuration instructions to include instructions for traversing the second graph.

In some embodiments, the first graph includes a plurality of first sub-graphs, and wherein the first configuration instructions include instructions for traversing each first sub-graph of the plurality of first sub-graphs.

In some embodiments, the second graph includes a plurality of second sub-graphs, wherein at least one second sub-graph of the plurality of second sub-graphs corresponds to at least one first sub-graph of the plurality of first sub-graphs, and wherein the second configuration instructions include instructions for traversing each second sub-graph of the plurality of second sub-graphs.

In some embodiments, the replacing the first graph with the second graph includes replacing at least one sub-graph of the first graph with at least one sub-graph of the second graph.

In some embodiments, selecting a candidate graph from the plurality of candidate graphs includes: for each respective candidate graph of the plurality of candidate graphs by: identifying paths for traversing the respective candidate graph; identifying a critical path length for the respective candidate graph based at least in-part on the paths; determining that a performance level of the respective candidate graph is greater than performance levels of other candidate graphs of the plurality of candidate graphs by comparing the critical path length for the respective candidate graph to other critical path lengths for the other candidate graphs; and setting the respective candidate graph as the candidate graph based at least in part on the determining.

In some embodiments, a path length of a path for traversing the second graph is less than a path length of a path of the set of paths for traversing the first graph.

In some embodiments, the method further includes executing the second configuration instructions, wherein executing the second configuration instructions includes executing tasks associated with a plurality of sub-graphs of the second graph.

Some embodiments include a system that includes one or more processors; and one or more computer-readable media storing instructions which, when executed by the one or more processors, cause the system to perform part or all of the operations and/or methods disclosed herein.

Some embodiments include one or more non-transitory computer-readable media storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
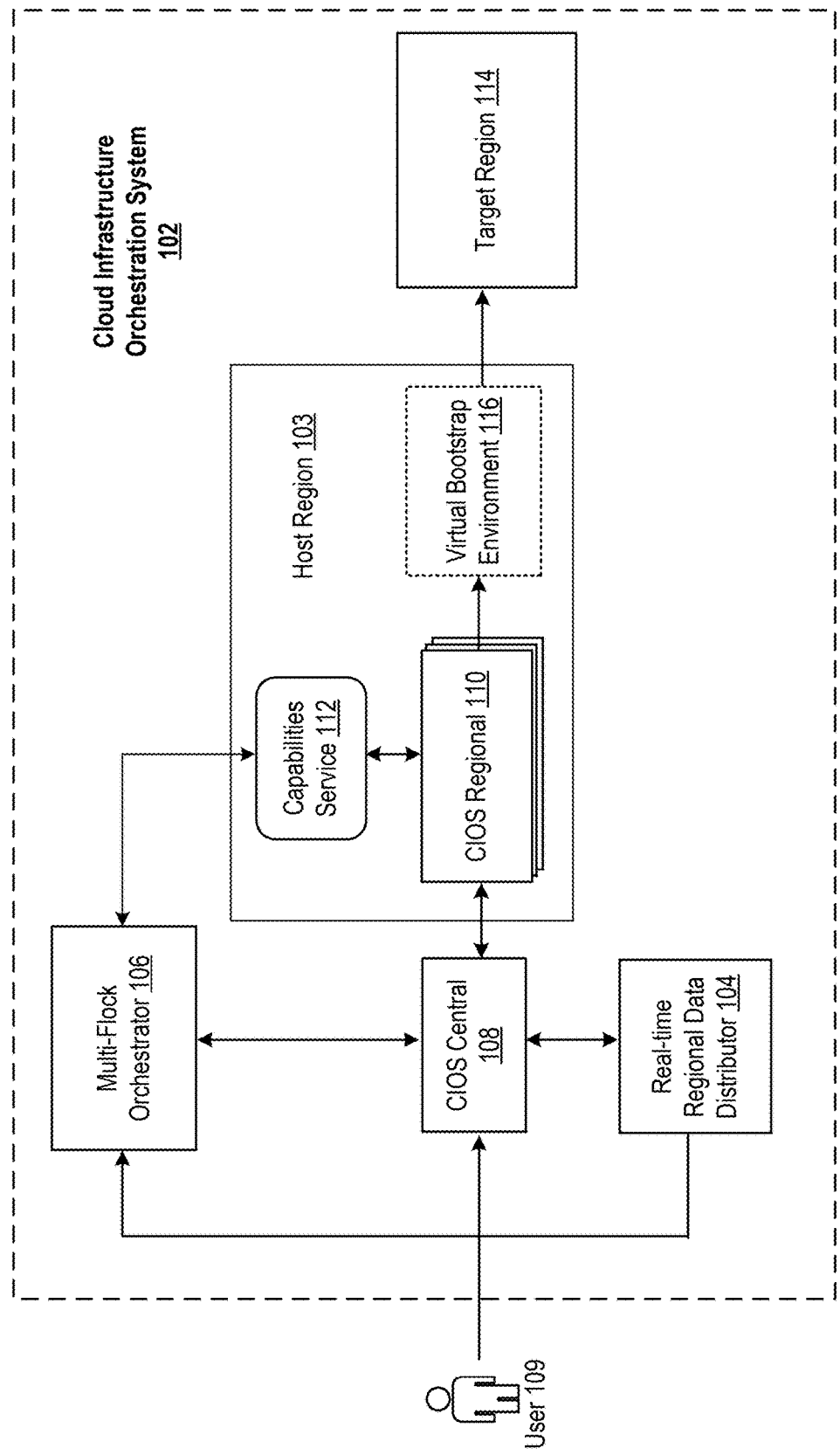
FIG. 1 is a block diagram of an environment in which a cloud infrastructure orchestration service may operate to dynamically provide bootstrap services in a region, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure, and which are used to provide a cloud service to a customer, are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data center and includes a set of resources that are used to provide the set of services.

Building a new data center in a region is a very complex activity requiring extensive coordination between various bootstrapping activities. At a high level, this involves the performance and coordination of various tasks such as: identifying the set of services to be provided by the data center; identifying various resources that are needed for providing the set of services; creating, provisioning, and deploying the identified resources; wiring the resources properly so that they can be used in an intended manner; and the like. Each of these tasks further have subtasks that need to be coordinated, further adding to the complexity. Due to this complexity, presently, the building of a data center in a region involves several manually initiated or manually controlled tasks that require careful manual coordination. As a result, the task of building a new region (i.e., building one or more data centers in a region) is very time consuming. It can take time, for example many months, to build a data center. Additionally, the process is very error prone, sometimes requiring several iterations before a desired configuration of the data center is achieved, which further adds to the time taken to build a data center. These limitations and problems severely limit a CSP's ability to grow computing resources in a timely manner responsive to increasing customer needs.

The present disclosure describes techniques for reducing build time, reducing computing resource waste, and reducing risk related to building one or more data centers in a region. Instead of weeks and months needed to build a data center in a region in the past, the techniques described herein can be used to build a new data center in a region in a relatively much shorter time, while reducing the risk of errors over conventional approaches.

A Cloud Infrastructure Orchestration Service (CIOS) is disclosed herein that is configured to bootstrap (e.g., provision and deploy) services into a new data center based on predefined configuration files that identify the resources (e.g., infrastructure components and software to be deployed) for implementing a given change to the data center. The CIOS can parse and analyze configuration files (e.g., flock configs) to identify dependencies between resources, execution targets, phases, and flocks. The CIOS may generate specific data structures from the analysis and may use these data structures to drive operations and to manage an order by which services are bootstrapped to a region. The CIOS may utilize these data structures to identify when it can bootstrap a service, when bootstrapping is blocked, and/or when bootstrapping operations associated with a previously blocked service can resume. Advantageously, the CIOS can identify circular dependencies within the data structures and execute operations to eliminate/resolve these circular dependencies prior to task execution. Using these techniques, the CIOS substantially reduces the risk of executing tasks prior to the availability of the resources on which those tasks depend.

Utilizing the techniques disclosed herein, the CIOS may optimize parallel processing to execute changes to a data center while ensuring that tasks are not initiated until the functionality on which those tasks depend is available in the region. In this manner, the CIOS enables a region build to be performed more efficiently, which greatly reduces the time required to build a data center and the wasteful computing resource use found in conventional approaches.

Certain Definitions

A "region" is a logical abstraction corresponding to a geographical location. A region can include any suitable number of one or more execution targets. In some embodiments, an execution target could correspond to a data center.

An "execution target" refers to the smallest unit of change for executing a release. A "release" refers to a representation of an intent to orchestrate a specific change to a service (e.g., deploy version 8, "add an internal DNS record," etc.). For most services, an execution target represents an "instance" of a service. A single service can be bootstrapped to each of one or more execution targets. An execution target may be associated with a set of devices (e.g., a data center).

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component or a Kubernetes engine cluster, this may include software (e.g., an application), configuration information (e.g., a configuration file) for an infrastructure component, or the like.

A "flock config" refers to a configuration file (or a set of configuration files) that describes a set of all resources (e.g., infrastructure components and artifacts) associated with a single service. A flock config may include declarative statements that specify one or more aspects corresponding to a desired state of the resources of the service.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "capability" identifies a unit of functionality associated with a service. The unit could be a portion, or all, of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPsec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and tested in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A Multi-Flock Orchestrator (MFO) may be a computing component (e.g., a service) that coordinates events between components of the CIOS to provision and deploy services to a target region (e.g., a new region). An MFO tracks relevant events for each service of the region build and takes actions in response to those events.

A "host region" refers to a region that hosts a virtual bootstrap environment (ViBE). A host region may be used to bootstrap a ViBE.

A "target region" refers to a region under build.

"Publishing a capability" refers to "publishing" as used in a "publisher-subscriber" computing design or otherwise providing an indication that a particular capability is available (or unavailable). The capabilities are "published" (e.g., collected by a capabilities service, provided to a capabilities service, pushed, pulled, etc.) to provide an indication that functionality of a resource/service is available. In some embodiments, capabilities may be published/transmitted via an event, a notification, a data transmission, a function call, an API call, or the like. An event (or other notification/data transmission/etc.) indicating availability of a particular capability can be broadcasted/addressed (e.g., published) to a capabilities service.

A "Capabilities Service" may be a flock configured to model dependencies between different flocks. A capabilities service may be provided within a Cloud Infrastructure Orchestration Service (CIOS) and may define what capabilities, services, features have been made available in a region.

A "Real-time Regional Data Distributor" (RRDD) may be a service or system configured to manage region data. This region data can be injected into flock configs to dynamically create execution targets for new regions.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional, both of which will be described in further detail below) that may be configured to manage bootstrapping tasks (provisioning and deployment) for a given service and a Multi-Flock Orchestrator (also described in further detail below) configured to initiate/manage region builds (e.g., bootstrapping operations corresponding to multiple services).

The CIOS enables region building and world-wide infrastructure provisioning and code deployment with minimal manual run-time effort from service teams (e.g., beyond an initial approval and/or physical transportation of hardware, in some instances). The high-level responsibilities of the CIOS include, but are not limited to, coordinating region builds, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

The CIOS can perform plan generation, where differences between the desired and current state of the resources are identified. Part of plan generation can include identifying the operations that would need to be executed to bring the resources from the current state to the desired state. In some examples, the CIOS may present a generated plan to a user for approval. In these examples, the CIOS can mark the plan as approved or rejected based on user input from the user. Thus, users can spend less time reasoning about the plan and the plans are more accurate because they are machine generated. Plans are almost too detailed for human consumption; however, the CIOS can provide this data via a sophisticated user interface (UI).

In some examples, the CIOS can handle execution of change management by executing the approved plan. Once an execution plan has been created and approved, engineers may no longer need to participate in change management unless the CIOS initiates roll-back. The CIOS can handle rolling back to a previous service version by generating a plan that returns the service to a previous (e.g., pre-release) state (e.g., when CIOS detects service health degradation while executing).

The CIOS can measure service health by monitoring alarms and executing integration tests. The CIOS can help teams quickly define roll-back behavior in the event of service degradation, which it can later execute. The CIOS can generate and display plans and can track approval. The CIOS can combine the functionality of provisioning and deployment in a single system that coordinates these tasks across a region build. The CIOS also supports the discovery of flocks (e.g., service resources such as flock config(s) corresponding to any suitable number of services), artifacts, resources, and dependencies. The CIOS can discover dependencies between execution tasks at every level (e.g., resource level, execution target level, phase level, service level, etc.) through a static analysis (e.g., including parsing and processing content) of one or more configuration files. Using these dependencies, the CIOS can generate various data structures from these dependencies that can be used to drive task execution (e.g., tasks regarding provisioning of infrastructure resources and deployment of artifacts across the region).

FIG. 1 is a block diagram of an environment 100 in which a Cloud Infrastructure Orchestration Service (CIOS) 102 may operate to dynamically provide bootstrap services in a region, according to at least one embodiment. CIOS 102 can include, but is not limited to, the following components: Real-time Regional Data Distributor (RRDD) 104, Multi-Flock Orchestrator (MFO) 106, CIOS Central 108, CIOS Regional 110, and Capabilities Service 112. Specific functionality of CIOS Central 108 and CIOS Regional 110 is provided in more detail in U.S. application Ser. No. 17/016, 754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail in U.S. application Ser. No. 17/016,754 and below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 may be configured to manage region data, either directly or indirectly (e.g., via RRDD 104). CIOS Central 108 may be configured to compile flock configs to inject region data as variables within the flock configs.

Each instance of CIOS Regional 110 may correspond to a module configured to execute bootstrapping tasks that are associated with a single service of a region. CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes are needed to one or more resources. For example, CIOS Regional 110 can determine that one or more infrastructure components need to be provisioned, one or more artifacts deployed, or any suitable change needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

Capabilities Service 112 is configured to maintain capabilities data that indicates 1) what capabilities of various services are currently available, 2) whether any resource/ service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to MFO 106 and/or CIOS Regional 110 (e.g., each instance of CIOS Regional 110). In some embodiments, MFO 106 and/or any suitable component or module of CIOS Regional 110 may be configured to request capabilities data from Capabilities Service 112.

In some embodiments, Multi-Flock Orchestrator (MFO) 106 may be configured to drive region build efforts. In some embodiments, MFO 106 can manage information that describes what flock/flock config versions and/or artifact versions are to be utilized to bootstrap a given service within a region (or to make a unit of change to a target region). In some embodiments, MFO 106 may be configured to monitor (or be otherwise notified of) changes to the region data managed by Real-time Regional Data Distributor 104. In some embodiments, receiving an indication that region data has been changed may cause a region build to be triggered by MFO 106. In some embodiments, MFO 106 may collect various flock configs and artifacts to be used for a region build. Some, or all, of the flock configs may be configured to be region agnostic. That is, the flock configs may not explicitly identify what regions to which the flock is to be bootstrapped. In some embodiments, MFO 106 may trigger a data injection process through which the collected flock configs are recompiled (e.g., by CIOS Central 108). During recompilation, operations may be executed (e.g., by CIOS Central 108) to cause the region data maintained by Real-time Regional Data Distributor 104 to be injected into the config files. Flock configs can reference region data through variables/parameters without requiring hard-coded identification of region data. The flock configs can be dynamically modified at run time using this data injection rather than having the region data be hardcoded, and therefore, and more difficult to change.

Multi-Flock Orchestrator 106 can perform a static flock analysis in which the flock configs are parsed to identify dependencies between resources, execution targets, phases, and flocks, and in particular to identify circular dependencies that need to be removed. In some embodiments, MFO 106 can generate any suitable number of data structures based on the dependencies identified. These data structures (e.g., directed acyclic graph(s), linked lists, etc.) may be utilized by the Cloud Infrastructure Orchestration Service (CIOS) 102 to drive operations for performing a region build. By way of example, these data structures may collectively define an order by which services are bootstrapped within a region. An example of such a data structure is discussed further below with respect to Build Dependency Graph 338 of FIG. 3. If circular dependencies (e.g., service A requires service B and vice versa) exist and are identified through the static flock analysis and/or graph, MFO may be configured to notify any suitable service teams that changes are required to the corresponding flock config to correct these circular dependencies. MFO 106 can be configured to traverse one or more data structures to manage an order by which services are bootstrapped to a region. MFO 106 can identify (e.g., using data obtained from Capabilities Service 112) capabilities available within a given region at any given time. MFO 106 can this data to identify when it can bootstrap a service, when bootstrapping is blocked, and/or when bootstrapping operations associated with a previously blocked service can resume. Based on this traversal, MFO 106 can perform a variety of releases in which instructions are transmitted by MFO 106 to CIOS Central 108 to perform bootstrapping operations corresponding to any suitable number of flock configs. In some examples, MFO 106 may be configured to identify that one or more flock configs may require multiple releases due to circular dependencies found within the graph. As a result, MFO 106 may transmit multiple instruction sets to CIOS Central 108 for a given flock config to break the circular dependencies identified in the graph.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment 116. Virtual bootstrap environment (ViBE) 116 may be an overlay network that is hosted by host region 103 (a preexisting region that has previously been configured with a core set of services and which is communicatively available and secure). MFO 106 can leverage resources of the host region 103 to bootstrap resources to the ViBE 116 (generally referred to as "building the ViBE"). By way of example, MFO 106 can provide instructions through CIOS Central 108 that cause an instance of CIOS Regional 110 within a host region (e.g., host region 103) to bootstrap another instance of CIOS Regional within the ViBE 116. Once the CIOS Regional within the ViBE is available for processing, bootstrapping the services for the target region 114 can continue within the ViBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided.

Figure 2:
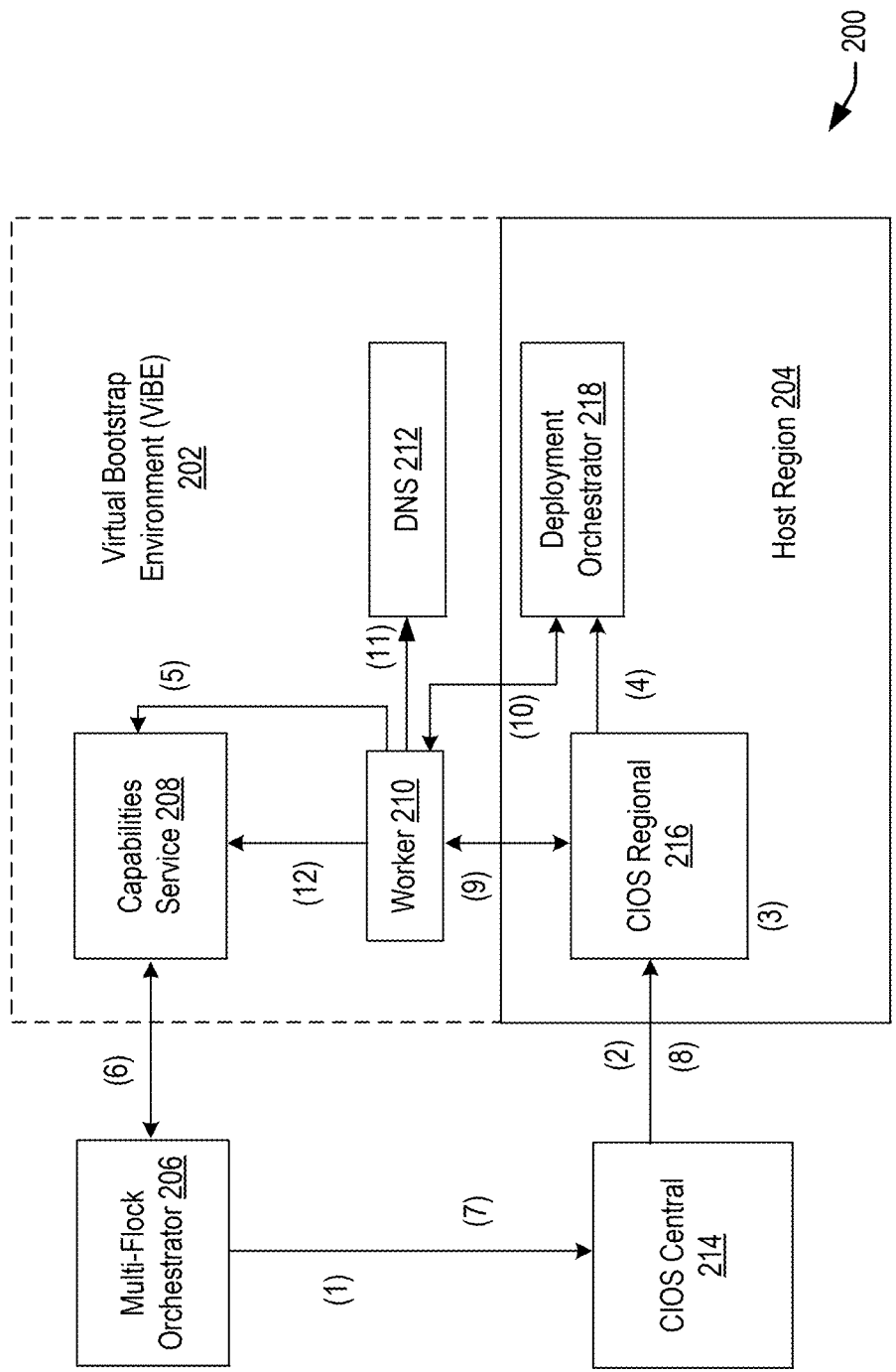
FIG. 2 is a block diagram for illustrating an environment and method for building a virtual bootstrap environment (ViBE), according to at least one embodiment.

FIG. 2 is a block diagram for illustrating an environment 200 and method for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a core set of services may be bootstrapped. While those core set of services exist in the host region 204, they do not yet exist in the ViBE (nor the target region). These essential core services provide the functionality needed to provision devices, establish a chain of trust to the new region, and deploy remaining services (e.g., flocks) into a region. The ViBE 202 may be a tenancy that is deployed in a host region 204. It can be thought of as a virtual region.

When the target region is available to provide bootstrapping operations, the ViBE 202 can be connected to the target region so that services in the ViBE can interact with the services and/or infrastructure components of the target region. This will enable deployment of production level services, instead of self-contained seed services as in previous systems, and will require connectivity over the internet to the target region. Conventionally, a seed service was deployed as part of a container collection and used to bootstrap dependencies necessary to build out the region.

Using infrastructure/tooling of an existing region, resources may be bootstrapped (e.g., provisioned and deployed) into the ViBE 202 and connected to the service enclave of a region (e.g., host region 204) in order to provision hardware and deploy services until the target region is self-sufficient and can be communicated with directly. Utilizing the ViBE 202 allows for standing up the dependencies and services needed to be able to provision/prepare infrastructure and deploy software while making use of the host region's resources in order to break circular dependencies of core services.

Multi-Flock Orchestrator (MFO) 206 may be configured to perform operations to build (e.g., configure) ViBE 202. MFO 206 can obtain applicable flock configs corresponding to various resources to be bootstrapped to the new region (in this case, a ViBE region, ViBE 202). By way of example, MFO 206 may obtain a flock config (e.g., a "ViBE flock config") that identifies aspects of bootstrapping Capabilities Service 208 and Worker 210. As another example, MFO 206 may obtain another flock config corresponding to bootstrapping Domain Name Service (DNS) 212 to ViBE 202.

At step 1, MFO 206 may instruct CIOS Central 214 (e.g., an example of CIOS Central 108 and CIOS Central 214 of FIGS. 1 and 2, respectively). For example, MFO 206 may transmit a request (e.g., including the ViBE flock config) to request bootstrapping of the Capabilities Service 208 and Worker 210 that, at this time do not yet exist in the VIBE 202. In some embodiments, CIOS Central 214 may have access to all flock configs. Therefore, in some examples, MFO 206 may transmit an identifier for the ViBE flock config rather than the file itself, and CIOS Central 214 may independently obtain it from storage (e.g., from DB 308 or flock DB 312 of FIG. 3).

At step 2, CIOS Central 214 may provide the ViBE flock config via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regional may instruct deployment orchestrator 218 (e.g., an example of a core service, or other write, build, and deploy applications software, of the host region 204) to execute instructions that in turn cause Capabilities Service 208 and Worker 210 to be bootstrapped within ViBE 202.

At step 5, a capability may be transmitted to the Capabilities Service 208 (from the CIOS Regional 216, Deployment Orchestrator 218 via the Worker 210 or otherwise) indicating that resources corresponding to the ViBE flock are available. Capabilities Service 208 may persist this data. In some embodiments, the Capabilities Service 208 adds this information to a list it maintains of available capabilities with the ViBE. By way of example, the capability provided to Capabilities Service 208 at step 5 may indicate the Capabilities Service 208 and Worker 210 are available for processing.

At step 6, MFO 206 may identify that the capability indicating that Capabilities Service 208 and Worker 210 are available based on receiving or obtaining data (an identifier corresponding to the capability) from the Capabilities Service 208.

At step 7, as a result of receiving/obtaining the data at step 6, the MFO 206 may instruct CIOS Central 214 to bootstrap a DNS service (e.g., DNS 212) to the ViBE 202. The instructions may identify or include a particular flock config corresponding to the DNS service.

At step 8, the CIOS Central 214 may instruct the CIOS Regional 216 to deploy DNS 212 to the ViBE 202. In some embodiments, the DNS flock config for the DNS 212 is provided by the CIOS Central 214.

At step 9, Worker 210, now that it is deployed in the ViBE 202, may be assigned by CIOS Regional 216 to the task of deploying DNS 212. Worker may execute a declarative infrastructure provisioner in the manner described above in connection with FIG. 3 to identify (e.g., from comparing the flock config (the desired state) to a current state of the (currently non-existing) resources associated with the flock) a set of operations that need to be executed to deploy DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 notifies Capabilities Service 208 that DNS 212 is available in ViBE 202. MFO 206 may subsequently identify that the resources associated with the ViBE flock config and the DNS flock config are available any may proceed to bootstrap any suitable number of additional resources to the ViBE.

After steps 1-12 are concluded, the process for building the ViBE 202 can be considered complete and the ViBE 202 can be considered built.

Figure 3:
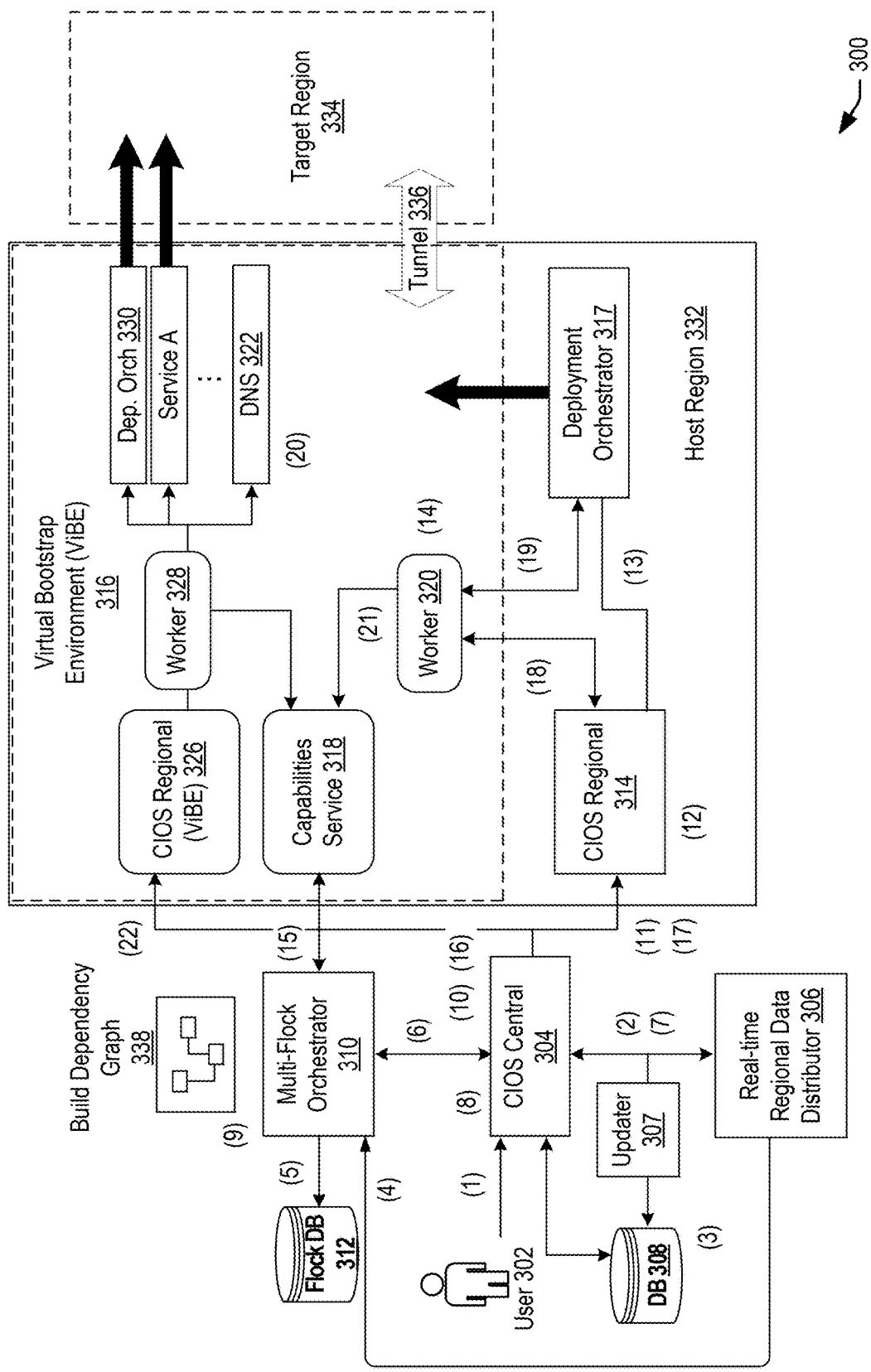
FIG. 3 is a block diagram for illustrating an environment and method for bootstrapping services to a target region utilizing the ViBE, according to at least one embodiment.

FIG. 3 is a block diagram for illustrating an environment 300 and method for bootstrapping services to a target region utilizing the ViBE, according to at least one embodiment.

At step 1, user 302 may utilize any suitable user interface provided by CIOS Central 304 (an example of CIOS Central 108 and CIOS Central 214 of FIGS. 1 and 2, respectively) to modify region data. By way of example, user 302 may create a new region to which a number of services are to be bootstrapped.

At step 2, CIOS Central 304 may execute operations to send the change to RRDD 306 (e.g., an example of RRDD 104 of FIG. 1). At step 3, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 4, MFO 310 (an example of the MFO 106 and 206 of FIGS. 1 and 2, respectively) may detect the change in region data. In some embodiments, MFO 310 may be configured to poll RRDD 306 for changes in region data. In some embodiments, RRDD 306 may be configured to publish or otherwise notify MFO 310 of region changes.

At step 5, detecting the change in region data may trigger MFO 310 to obtain a version set (e.g., a version set associated with a particular identifier such as a "golden version set" identifier) that identifies a particular version for each flock (e.g., service) that is to be bootstrapped to the new region and a particular version for each artifact corresponding to that flock. The version set may be obtained from DB 312. As flocks evolve and change, the versions for their corresponding configs and artifacts used for region build may change. These changes may be persisted in flock DB 312 such that MFO 310 may identify which versions of flock configs and artifacts to use for building a region (e.g., a ViBE region, a Target Region/non-ViBE Region, etc.). The flock configs (e.g., all versions of the flock configs) and/or artifacts (e.g., all versions of the artifacts) may be stored in DB 308, DB 312, or any suitable data store accessible to the CIOS Central 304 and/or MFO 310.

At step 6, MFO 310 may request CIOS Central 304 to recompile of each of the flock configs associated with the version set with the current region data. In some embodiments, the request may indicate a version for each flock config and/or artifact corresponding to those flock configs.

At step 7, CIOS Central 304 may obtain current region data from the DB 308 (e.g., directly, or via Real-time Regional Data Distributor 306) and retrieve any suitable flock config and artifact in accordance with the versions requested by MFO 310.

At step 8, CIOS Central 304 may recompile the flock configs with the region data obtained at step 7 to inject the flock configs with current region data. CIOS Central 304 may return the compiled flock configs to MFO 310. In some embodiments, CIOS Central 304 may simply indicate compilation is done, and MFO 310 may access the recompiled flock configs via RRDD 306.

At step 9, MFO 310 may perform a static analysis of the recompiled flock configs. As part of the static analysis, MFO 310 may parse the flock configs (e.g., using a library associated with a declarative infrastructure provisioner (e.g., Terraform, or the like)) to identify dependencies between flocks. From the analysis and the dependencies identified, MFO 310 can generate Build Dependency Graph 338. Build Dependency Graph 338 may be an acyclic directed graph that identifies an order by which flocks are to be bootstrapped (and/or changes indicated in flock configs are to be applied) to the new region. Each node in the graph may correspond to bootstrapping any suitable portion of a particular flock. The specific bootstrapping order may be identified based at least in part on the dependencies. In some embodiments, the dependencies may be expressed as an attribute of the node and/or indicated via edges of the graph that connect the nodes. MFO 310 may traverse the graph (e.g., beginning at a starting node) to drive the operations of the region build.

In some embodiments, MFO 310 may utilize a cycle detection algorithm to detect the presence of a cycle (e.g., service A depends on service B and vice versa). MFO 310 can identify orphaned capabilities dependencies. For example, MFO 310 can identify orphaned nodes of the Build Dependency Graph 338 that do not connect to any other nodes. MFO 310 may identify falsely published capabilities (e.g., when a capability was prematurely published, and the corresponding functionality is not actually yet available). MFO 310 can detect from the graph that one or more instances of publishing the same capability exist. In some embodiments, any suitable number of these errors may be detected and MFO 310 (or another suitable component such as CIOS Central 304) may be configured to notify or otherwise present this information to users (e.g., via an electronic notification, a user interface, or the like). In some embodiments, MFO 310 may be configured to force delete/recreate resources to break circular dependencies and may once again provide instructions to CIOS Central 304 to perform bootstrapping operations for those resources and/or corresponding flock configs.

A starting node may correspond to bootstrapping the ViBE flock, a second node may correspond to bootstrapping DNS. The steps 10-15 correspond to deploying (via deployment orchestrator 317, an example of the deployment orchestrator 218 of FIG. 2) a ViBE flock to ViBE 316 (e.g., an example of ViBE 116 and 202 of FIGS. 1, and 2, respectively). That is, steps 10-15 of FIG. 3 generally correspond to steps 1-6 of FIG. 2. Once notified that capabilities exist corresponding to the ViBE flock being deployed (e.g., indicating that Capabilities Service 318 and Worker 320, corresponding to Capabilities Service 208 and Worker 210 of FIG. 2, are available) the MFO 310 recommence traversal of the Build Dependency Graph 338 to identify next operations to be executed.

By way of example, MFO 310 may continue traversing the Build Dependency Graph 338 to identify that a DNS flock is to be deployed. Steps 16-21 may be executed to deploy DNS 322 (an example of the DNS 212 of FIG. 2). These operations may generally correspond to steps 7-12 of FIG. 2.

At step 21, a capability may be stored indicating that DNS 322 is available. Upon detecting this capability, MFO 310 may recommence traversal of the Build Dependency Graph 338. On this traversal, the MFO 310 may identify that any suitable portion of an instance of CIOS Regional (e.g., an example of CIOS Regional 314) is to be deployed to the ViBE 316. In some embodiments, steps 16-21 may be substantially repeated with respect to deploying CIOS Regional (ViBE) 326 (an instance of CIOS Regional 314, CIOS Regional 110 of FIG. 1) and Worker 328 to the ViBE 316. A capability may be transmitted to the Capabilities Service 318 that CIOS Regional (ViBE) 326 is available.

Upon detecting the CIOS Regional (ViBE) 326 is available, MFO 310 may recommence traversal of the Build Dependency Graph 338. On this traversal, the MFO 310 may identify that a deployment orchestrator (e.g., Deployment Orchestrator 330, an example of the Deployment Orchestrator 317) is to be deployed to the ViBE 316. In some embodiments, steps 16-21 may be substantially repeated with respect to deploying Deployment Orchestrator 330. Information that identifies a capability may be transmitted to the Capabilities Service 318, indicating that Deployment Orchestrator 330 is available.

After Deployment Orchestrator 330 is deployed, ViBE 316 may be considered available for processing subsequent requests. Upon detecting Deployment Orchestrator 330 is available, MFO 310 may instruct subsequent bootstrapping requests to be routed to ViBE components rather than utilizing host region components (components of host region 332). Thus, MFO 310 can continue traversing the Build Dependency Graph 338, at each node instructing flock deployment to the ViBE 316 via CIOS Central 304. CIOS Central 304 may request CIOS Regional (ViBE) 326 to deploy resources according to the flock config.

At some point during this process, Target Region 334 may become available. Indication that the Target Region is available may be identifiable from region data for the Target Region 334 being provided by the user 302 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPsec) to provide one or more encrypted tunnels (e.g., IPsec tunnels such as tunnel 336) from the ViBE 316 to Target Region 334. As used herein, "IPSec" refers to a protocol suite for authenticating and encrypting network traffic over a network that uses Internet Protocol (IP) and can include one or more available implementations of the protocol suite (e.g., Openswan, Libreswan, strongSwan, etc.). The network may connect the ViBE 316 to the service enclave of the Target Region 334.

Prior to establishing the IPsec tunnels, the initial network connection to the Target Region 334 may be on a connection (e.g., an out-of-band VPN tunnel) sufficient to allow bootstrapping of networking services until an IPsec gateway may be deployed on an asset (e.g., bare-metal asset) in the Target Region 334. To bootstrap the Target Region's 334 network resources, Deployment Orchestrator 330 can deploy the IPsec gateway at the asset within Target Region 334. The Deployment Orchestrator 330 may then deploy VPN hosts at the Target Region 334 configured to terminate IPsec tunnels from the ViBE 316. Once services (e.g., Deployment Orchestrator 330, Service A, etc.) in the ViBE 316 can establish an IPsec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the ViBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 326 (e.g., by Worker 328).

With the hardware allocation of the Target Region 334 established and posted to capabilities service 318, CIOS Regional (ViBE) 326 can orchestrate the deployment of instances of core services from the ViBE 316 to the Target Region 334. This deployment may be similar to the processes described above for building the ViBE 316, but using components of the ViBE (e.g., CIOS Regional (ViBE) 326, Worker 328, Deployment Orchestrator 330) instead of components of the Host Region 332 service enclave. The deployment operations may generally correspond to steps 16-21 described above.

As a service is deployed from the ViBE 316 to the Target Region 334, the DNS record associated with that service may correspond to the instance of the service in the ViBE 316. The DNS record associated with the service may be updated at a later time to complete deployment of the service to the Target Region 334. Said another way, the instance of the service in the ViBE 316 may continue to receive traffic (e.g., requests) to the service until the DNS record is updated. A service may deploy partially into the Target Region 334 and publish information indicating a capability (e.g., to Capabilities Service 318) that the service is partially deployed. For example, a service running in the ViBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the ViBE 316. Once data migration for the service is complete, the DNS record may be updated to point to the operational service deployed in the Target Region 334. The deployed service in the Target Region 334 may then receive traffic (e.g., requests) for the service, while the instance of the service in the ViBE 316 may no longer receive traffic for the service.

Region Build Process Improvements

As discussed above, cloud features for a region being built are expressed through the publishing of capabilities. During a region build, if a capability is published to the region being built, then a cloud feature corresponding to that capability becomes available in the region. Typically, a region build process has a set of deployment phases. Each deployment phase has a set of dependencies. Once all the dependencies of the set of dependencies for a deployment phase are satisfied, the deployment phase can be deployed. Deploying a deployment phase publishes a set of capabilities for the region, which in turn enables other deployment phases to be deployed and additional capabilities to be published. Often region build activities are organized as a graph as such as directed acyclic graph (DAG).

Typically, as discussed above, during a region build, an orchestrator such as the MFO 106 described above identifies dependencies between resources, execution targets, phases, and flocks, and generates data structures based on the dependencies identified. These data structures may be utilized by an orchestration service such as the CIOS 102 described above to drive operations for performing a region build. Generally, these data structures collectively define an order by which services are bootstrapped within a region. An example of such a data structure is a DAG. During a region build, the orchestrator can traverse the DAG to manage an order by which services are bootstrapped to the region. Based on this traversal, the orchestrator can perform a variety of releases in which instructions are transmitted by a central service such as the CIOS Central 304 described above to perform bootstrapping operations. As a result, new capabilities for the region can be published. Techniques for building regions based on a data structures are described in U.S. patent application Ser. No. 18/076,238, filed Dec. 6, 2022, U.S. patent application Ser. No. 18/098,617, filed Jan. 18, 2023, U.S. patent application Ser. No. 18/163,219, filed Feb. 1, 2023, and U.S. patent application Ser. No. 18/163, 266, filed Feb. 1, 2023, each of which is incorporated by reference in its entirety as if fully set forth herein.

In generating a data structure such as a DAG, the orchestrator organizes different region build activities into different categories such as high-level activities and lower-level activities and generates a multi-level graph based on the different categories of activities. During the region build, the orchestrator then traverses nodes of the DAG associated with the higher-level activities before traversing nodes of the DAG that are associated with the lower-level activities. In some cases, the orchestrator divides the DAG into a sub-DAG of higher-level activities and one or more sub-DAGs of lower-level activities and then traverses the sub-DAG of higher-level activities before traversing each of the one or more sub-DAGs of lower-level activities. In many cases, each DAG (e.g., the sub-DAG of higher-level activities and each sub-DAG of lower-level activities) includes thousands of nodes. As such, traversing the DAG and thereby building the region often takes a significant amount of time.

To improve the region build process and reduce the time it takes to build a region, a graph analysis technique such as critical path analysis may be employed by the orchestrator and/or the central service to analyze the impact that each of the higher-level and lower-level activities have on the overall performance of the region build process. For example, while traversing a respective sub-DAG of the one or more sub-DAGs, the orchestrator and/or the central service can employ a critical path analysis to determine a critical path for the respective sub-DAG and an overall critical path length for the DAG that includes the respective sub-DAG based on the critical path. The orchestrator and/or the central service can then use the overall critical path length for the DAG to determine which node(s) of the DAG, and/or a sub-DAG has the greatest impact on the total build time of the region and then take some action to lessen the impact (e.g., combine activities of nodes along the critical path).

However, relying on a graph analysis technique often leads to incomplete, incorrect, and/or inaccurate results, especially in cases in which the DAG has many nodes. For example, based on the graph analysis technique, the orchestrator and/or the central service may decide to decrease times associated with tasks corresponding to nodes of the DAG to reduce one or more path lengths of the DAG. However, simply reducing one or more path lengths of the DAG may not result in reduced region build times and/or increased region build efficiency. For example, if a task corresponding to a node of the DAG takes a certain amount time to complete, reducing that time in half may not decrease the overall region build time because to a parallel branch of the DAG may have a critical path length that is just shorter than the critical path length in which the node is included (e.g., critical path A having a critical path length A that is one second shorter than a critical path length B of critical path B). As a result, the overall region build time would just be reduced by the time difference between the original critical path and the resulting critical path. Therefore, it may be desirable to improve the DAG creation process and thereby the region build process to reduce the time it takes to build a region and increase the efficiency in which that region is built.

The techniques described herein overcome these challenges and others by providing region build process improvements. Using the techniques described herein, the overall time it takes to build a region can be reduced and region building efficiency can be increased. The techniques described herein provide a framework to generate and test different region build process candidates using a graph rewrite technique. The graph rewrite technique described herein generates different graphs representing different region build candidates by making an adjustment to nodes of respective graphs and making sub-adjustments to nodes that depend on the adjusted nodes. The different graphs representing the different region build process candidates can be tested using a graph analysis technique and the graph representing the region build process candidate that yields the best results in terms of overall region build time can be selected as the graph to be used to build the region and the region can be built using the selected graph. In this way, region build time can be reduced. As such, the techniques described herein facilitate identifying the most impactful improvements during the region build process, which in turn results in implementing region build process improvements with greater efficiency and less resources in terms of costs and time.

Figure 4:
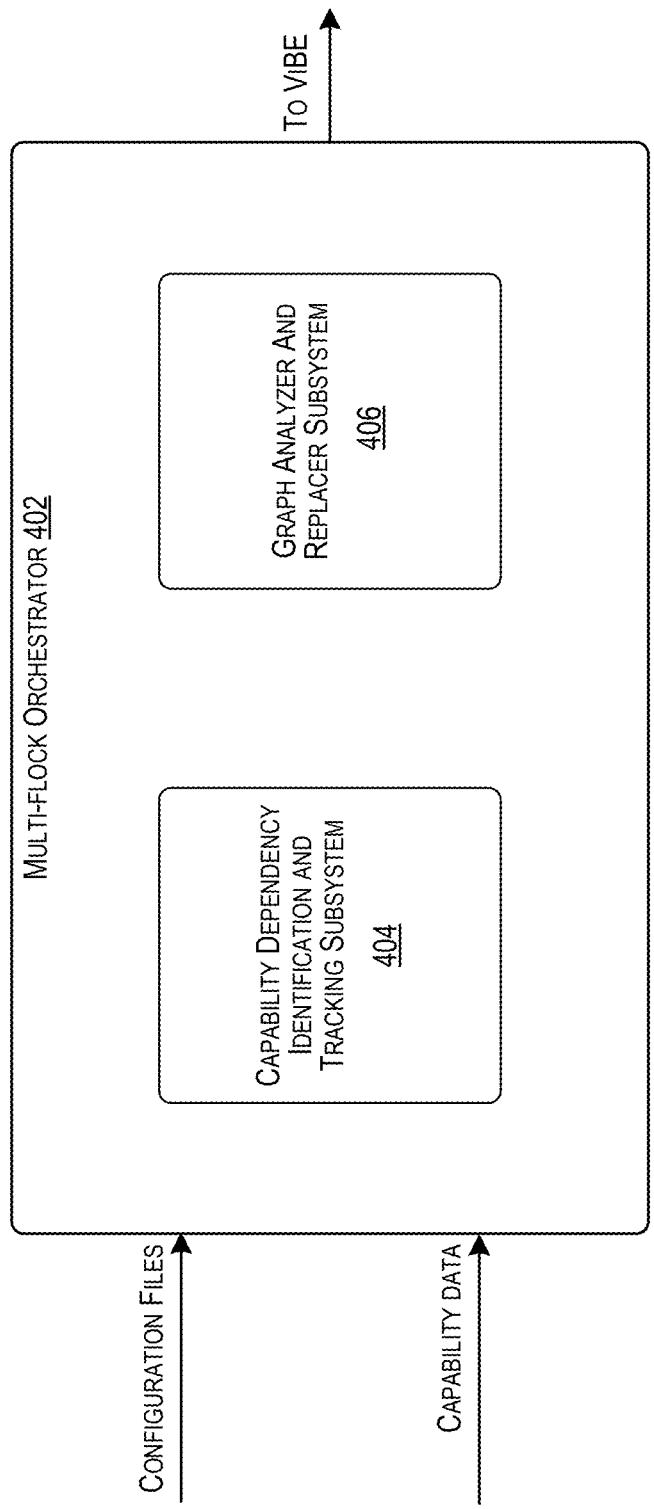
FIG. 4 is a simplified block diagram of an example of a multi-flock orchestrator for improving region build processes according to certain embodiments.

FIG. 4 is a simplified block diagram of an example of a multi-flock orchestrator (MFO) 402. As shown in FIG. 4, the MFO 402 includes a capability dependency identification and tracking subsystem 404 and a graph analyzer and replacer subsystem 406. In some implementations, the MFO 402 can be included in an environment such as the environment 300. The MFO 402 can be configured to receive capability data from a capabilities service such as the capabilities service 318 and process the capability data. As described above, the capability data can include data that describes capabilities and corresponding statuses, flocks, and phases that are associated with a region build. The MFO 402 can also be configured to receive configuration files from a computing component such as CIOS Central 304 and process the configuration files. As described above, the configuration files can include a configuration file that describes a set of resources that is associated with a service or flock that is to be deployed as part of the region build (e.g., infrastructure components and artifacts) and can include instructions such as declarative statements that specify one or more aspects corresponding to a desired state of the resources associated with the service (e.g., instructions to build a graph that includes a set of nodes and instructions to traverse that graph).

During a region build process, the capability dependency identification and tracking subsystem 404 can be configured to receive a configuration file as an input and process the configuration file to identify dependency information that describes dependencies between capabilities/bootstrapping tasks associated with the region that is the target of the region build. In some implementations, a given configuration file can indicate any suitable number of capabilities on which the flock associated with the configuration depends. In some embodiments, the configuration file may indicate one or more capabilities that are to be published when bootstrapping the resources of the flock are concluded. Dependency information for a capability can be derived by identifying metadata for a capability (e.g., a capability type, a region or phase for the capability) and identifying (e.g., from the configuration file) capabilities that are required to be published before publishing the specified capability (or capabilities) of the flock may commence. In some implementations, the capability dependency identification and tracking subsystem 404 can process aspects of each capability and trace requests/calls to each dependent capability to identify dependent capabilities.

The capability dependency identification and tracking subsystem 404 can also be configured to generate a build dependency graph based at least in-part on the dependency information. In some implementations, the build dependency graph can be a directed acyclic graph (DAG) that includes a set of nodes, which can be configured to connect different region build activities based on their respective dependencies (i.e., those identified by the capability dependency identification and tracking subsystem 404 and included in the dependency information). In generating the DAG, the capability dependency identification and tracking subsystem 404 organizes different region build activities into different categories such as high-level activities and lower-level activities and generates a multi-level graph based on the different categories of activities. For example, the capability dependency identification and tracking subsystem 404 can generate a DAG that includes a sub-DAG of higher-level activities and one or more sub-DAGs of lower-level activities. In some implementations, the sub-DAG of higher-level activities and each sub-DAG of lower-level activities includes thousands of nodes.

Figure 5:
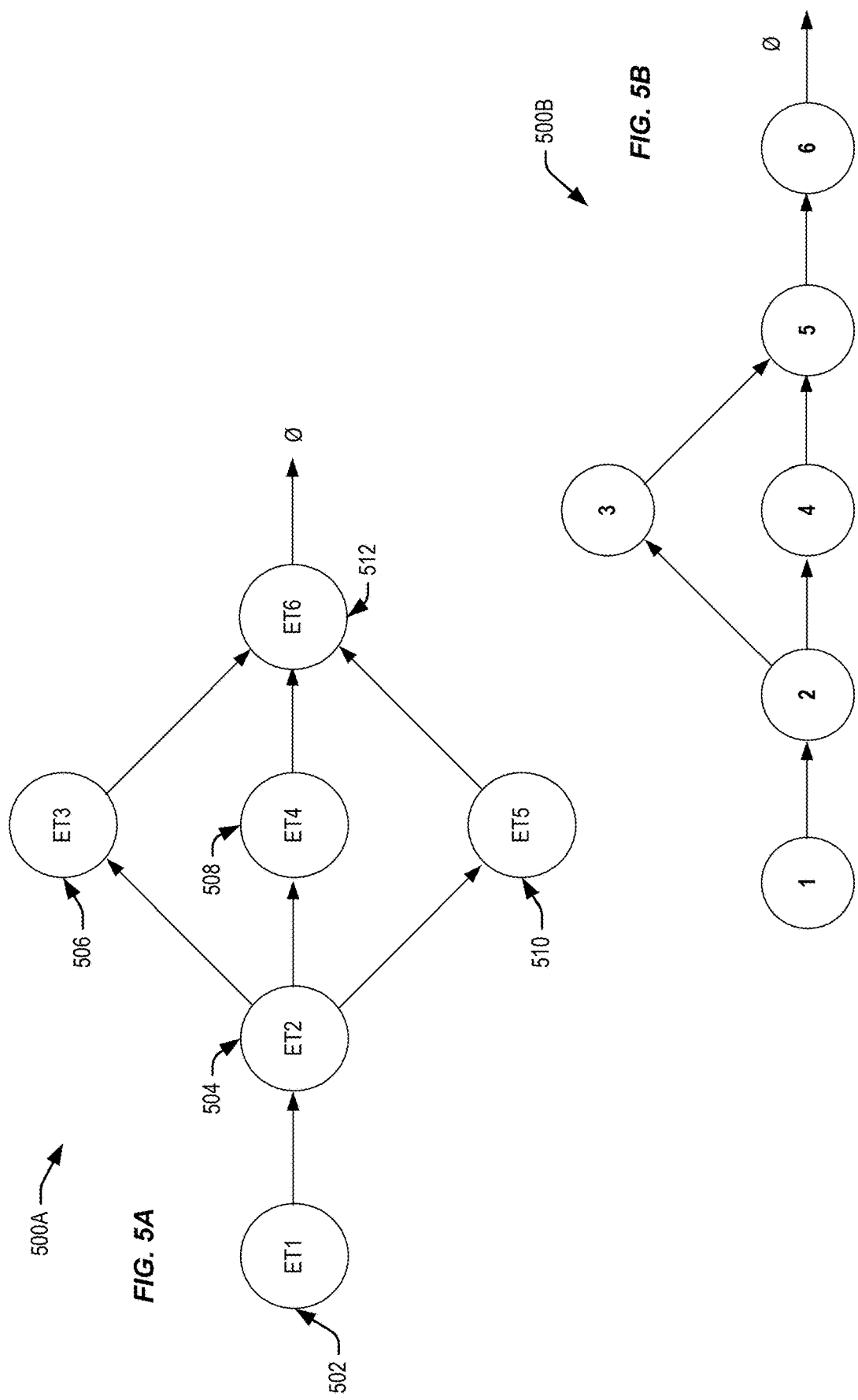
FIGS. 5A and 5B are examples of directed acyclic graphs used to drive operations for performing a region build according to certain embodiments.

FIG. 5A is an example of a DAG 500A used to drive operations for performing a region build. DAG 500A may be one of multiple data structures generated by the MFO 402 in response to one or more parses by orchestration service of a configuration file associated with the capability release. Each node of the DAG 500A may correspond with a single execution target (e.g., an individual resource). As illustrated in FIG. 5A, the DAG 500A includes six nodes (e.g., nodes 502, 504, 506, 508, 510, and 512). Each respective node may correspond to one of six execution targets. Each node of the DAG 500A may correspond to a data object that is configured to store any suitable information corresponding to a given execution target. By way of example, a given node may store any suitable number of variables, identifiers, data structures, pointers, references, etc. corresponding to a particular execution target. Each node of the DAG 500A may include a pointer/reference to one or more other nodes in the DAG 500A. By way of example, node 502 may include a reference to node 504, which may include references to nodes 506-510, which each may include a reference to node 512, which may indicate (e.g., via a null pointer) that it is the end node of the DAG 500A. In some implementations, nodes 506, 508, and 510 share a common dependency to node 504, thus the tasks associated with the nodes 506-510 may be executed, at least in part, concurrently. In some embodiments, node 512 may correspond to an execution target that depends on nodes 506-510. Thus, tasks associated with the execution target corresponding to node 512 may be executed only after tasks associated with all of the execution targets corresponding to nodes 506-510 have been completed. In some embodiments, the orchestration service may traverse the configuration file and generate DAG 500A from this traversal. The generation of DAG 500A may be completed as part of a preprocessing procedure executed before run time or at run time. Upon completing operations corresponding to a given execution target, the MFO 402 may traverse to the next execution target(s), repeating this process any suitable number of times until operations corresponding to one or more end nodes of the DAG 500A (e.g., node 512) have been completed. In some embodiments, if the operations corresponding to a given node are unsuccessful (e.g., produce an error), the MFO 402 may not traverse to the next node and may instead return a notification to alert the user of the situation. Each node of the DAG 500A may correspond to a data structure that is configured to identify and maintain an execution order corresponding to one or more resources (e.g., services, software modules, etc.). In some embodiments, the MFO 402 may deploy infrastructure resources and/or release software artifacts based at least in part on traversing the DAG 500A.

FIG. 5B is another example of a DAG 500B used to drive operations for performing a region build. As shown in FIG. 5B, DAG 500B may be a finite directed graph that includes any suitable number of nodes (e.g., six nodes as shown in FIG. 5B) and edges (e.g., seven edges as shown in FIG. 5B), with each edge being directed from one node to another as depicted in FIG. 5B. The nodes and edges may be arranged to avoid directed cycles. That is, the DAG 500B is arranged such that there is no way to start at any node and follow a consistently directed sequence of edges that eventually loop back to that same node. A last node (e.g., node "6"), may point to a null value or otherwise indicate an end to the DAG 500B. Although DAG 500B depicts six nodes and seven edges, DAG 500B may include any suitable number of nodes and directed edges. In some implementations, each node corresponds to a set of operations (e.g., operations for performing a task such as deploying and/or booting a resource such as resource A) or a set of capabilities on which a next node of operations depends. The directed edges of the DAG 500B define an order by which these operations are to be executed and/or a dependency between a subset of operations associated with a node and a subset of capabilities associated with an immediately preceding that node. As a simplistic example, nodes 1, 2, 5, 6, of DAG 500B are intended to depict nodes corresponding to four separate sets of operations. Based on the edges depicted in FIG. 5B, the operations of each node are to be executed in the order corresponding to the order of nodes 1, 2, 5, and 6. Nodes 3 and 4 are intended to depict nodes that individually correspond with one or more dependencies. By way of example, node 3 may correspond to a dependency of operations corresponding to node 5 on a capability associated with a different resource (e.g., resource B). Similarly, node 4 may correspond to a dependency of operations corresponding to node 5 on a capability associated with a different resource (e.g., resource C). In some embodiments, different capability nodes (e.g., a node identifying a dependency on a particular resource's capability/capabilities) may be used for different resources, or a single node may be utilized to specify all dependencies regardless of how many resources to which the dependencies refer. Thus, in some implementations, the dependency corresponding to resource B (e.g., identified in node 3) and the dependency corresponding to resource C (e.g., identified in node 4) may be combined in a single node.

The capability dependency identification and tracking subsystem 404 can be configured to traverse the DAG by executing the instructions in the configuration file and, based on traversing the DAG, identify bootstrapping tasks to be executed and an order by which those tasks are to be executed. In some implementations, traversing the DAG drives the order of bootstrapping task execution within the region being built, across regions being built, or the like. In some implementations, traversing the DAG includes traversing sub-graphs of the DAG. For example, in the case the DAG includes a sub-DAG of higher-level activities and one or more sub-DAGs of lower-level activities, the capability dependency identification and tracking subsystem 404 can traverse the sub-DAG of higher-level activities first and then, either concurrently and/or sequentially, traverse each sub-DAG of lower-level activities. In some implementations, the configuration file can include instructions for traversing each sub-DAG of lower-level activities concurrently and/or sequentially.

When reaching a node in the DAG (e.g., a node corresponding to a flock/set of resources to be bootstrapped), the capability dependency identification and tracking subsystem 404 can identify bootstrapping tasks to be executed and capabilities on which execution of the node's corresponding bootstrapping tasks depend. If the current node's tasks depend on one or more other capabilities being published, the capability dependency tracking subsystem 404 can execute operations for identifying whether those other capabilities have been published. For example, the capability dependency identification and tracking subsystem 404 may identify from any previously received capability data whether those other capabilities have been published. The capability dependency identification and tracking subsystem 404 may use the capabilities identified within that data to track capability availability within the region in order to determine whether to maintain its position or proceed along with its traversal of the build dependency graph.

Further, the capability dependency and tracking subsystem 404 can be configured to aggregate dependency information for each identified capability. The aggregated dependency information can be processed to derive insights into the capability data, such as identifying unpublished capabilities that, if published, would allow for an ability to publish the greatest number of other capabilities. The capability dependency and tracking subsystem 404 can generate capability dependency data specifying, for each capability, dependencies corresponding to those capabilities and a status of each capability in the CIOS (e.g., published/available, not yet published/available, etc.). The DAG and information describing its organization along with the capability dependency data can be provided to the graph analyzer and replacer subsystem 406.

The graph analyzer and replacer subsystem 406 can be configured to process the DAG, the information describing its organization, and the capability dependency data to: (i) determine a replacement DAG for the DAG and/or a replacement sub-DAG for one or more of its sub-DAGs; (ii)

replace the DAG and/or one or more of its sub-DAGs with the replacement DAG and/or replacement sub-DAG; and (iii) update the instructions in the configuration file to include instructions for traversing the replacement DAG and/or replacement sub-DAG. In some implementations, the original DAG including its sub-DAGs can be considered a first DAG and the replacement DAG including its replacement sub-DAGs can be considered a second DAG. In some implementations, at least one sub-DAG of the second DAG can correspond to at least one sub-DAG of the first DAG. In this way, the second DAG can include replacement sub-DAGs or a combination of sub-DAGs of the first DAG and replacement sub-DAGs. In some implementations, the instructions in the configuration file can be updated to include instructions for traversing the second DAG including its sub-DAGs. The graph analyzer and replacer subsystem 406 can be configured to provide the configuration file including the updated instructions to the capability dependency and tracking subsystem 404 where the updated instructions can be executed to perform tasks associated with the second DAG.

In some implementations, the second DAG can improve the region build process and reduce the time it takes to build a region. For example, in some implementations, a path length of a path for traversing the second DAG can be less than a path length of one or more paths for traversing the first graph. In another example, in some implementations, path lengths of paths for traversing the second DAG can be less than path lengths of paths for traversing the first DAG. In a further example, in some implementations, path lengths for each of the paths for traversing the second DAG can be less than path lengths of each of the paths for traversing the first DAG.

To determine a replacement DAG and/or a replacement sub-DAG (i.e., to determine the second DAG), the graph analyzer and replacer subsystem 406 can utilize a graph analysis technique such as critical path analysis to analyze a DAG such as the first DAG to determine the impact that activities associated with the DAG have on the overall performance of the region build process. For example, while traversing a respective sub-DAG of the one or more sub-DAGs of a DAG, the graph analyzer and replacer subsystem 406 can perform a critical path analysis to determine a critical path for the respective one or more sub-DAGs of the DAG and an overall critical path length for the DAG based on the critical path. The graph analyzer and replacer subsystem 406 can then use the overall critical path length for the DAG to determine which node(s) of the DAG, and/or a sub-DAG of the DAG has the greatest impact on the total build time of the region. To determine which node(s) of the DAG and/or the sub-DAG has the greatest impact on the total build time of the region, the graph analyzer and replacer subsystem 406 can identify execution times for executing region building activities or tasks associated with the nodes of the critical path of the first DAG to identify which node or nodes of the critical path is/are associated with the greatest execution times (e.g., an execution time that is greater than all other execution times and/or execution times that are greater than other execution times by a predetermined percentage such as 5%, 10%, 15%, and so on). In some implementations, as described above, an execution time associated with the node can be the time it takes to perform one or more region building tasks or activities that are associated with the node. For example, the graph analyzer and replacer subsystem 406 can determine that an execution time X for a node X of the critical path of the DAG is greater than execution times associated with other nodes of the critical path of the DAG. In another example, the graph analyzer and replacer subsystem 406 can determine that execution times X, Y, Z for nodes X, Y, and Z of the critical path of the DAG are respectively 5% greater than execution times associated with other nodes of the critical path of the DAG. In this way, the graph analyzer and replacer subsystem 406 can determine which node or node(s) of a critical path of a DAG has the greatest impact on performance of the region build.

In some implementations, to determine the replacement DAG and/or the replacement sub-DAG (i.e., to determine the second DAG), the graph analyzer and replacer subsystem 406 can analyze the initial DAG (i.e., the original or first DAG) to identify a set of paths for traversing the initial DAG. In some implementations, as described above, each path of the set of paths starts at a start node of the initial DAG and ends at an end node of the initial DAG and includes one or more nodes between the start node and the end node. The graph analyzer and replacer subsystem 406 can then identify a critical path from among the set of paths. In some implementations, as described above, the critical path is a path of the initial DAG that is associated with the minimum time needed to traverse the initial DAG from the start node to the end node. For example, for an initial DAG having five paths with each path associated with a traversal time, the path associated with a traversal time that is the least among the traversal times would be considered the critical path.

The graph analyzer and replacer subsystem 406 can then generate a plurality of candidate DAGs from the initial DAG. In some implementations, each candidate DAG can include one or more nodes of the initial DAG. To generate a candidate DAG, the graph analyzer and replacer subsystem 406 can reduce the execution time associated with a node of the initial DAG and/or reduce the execution times associated with nodes of the initial DAG. In some implementations, the graph analyzer and replacer subsystem 406 can reduce the execution time of the node that is associated with the greatest execution time among the execution times associated with the nodes of the initial DAG. In some implementations, the graph analyzer and replacer subsystem 406 can reduce the execution times of the nodes that are associated with the greatest execution times among the execution times associated with the nodes of the initial DAG. For example, for a DAG that includes node X having execution time X that is greater than execution times associated with other nodes of the DAG, the graph analyzer and replacer subsystem 406 can reduce the execution time X (e.g., 10 minutes reduced to 5 minutes). In another example, for a DAG that includes nodes X, Y, and Z having execution times X, Y, and Z that are greater than execution times associated with other nodes of the DAG, the graph analyzer and replacer subsystem 406 can reduce execution times X, Y, and Z (e.g., 15 minutes to 12 minutes, 20 minutes reduced to 5 minutes, and 1 minute reduced to 30 seconds). In some implementations, the graph analyzer and replacer subsystem 406 can reduce an execution time by a predetermined percentage (e.g., 5%, 10%, 15%, and so on). In this way, an execution time associated with the node in a respective candidate DAG of the candidate DAGs that are generated by the graph analyzer and replacer subsystem 406 can be different from an execution time associated with the node in other candidate DAGs that are generated by the graph analyzer and replacer subsystem 406 and the execution time associated with the node in the initial DAG.

The graph analyzer and replacer subsystem 406 can then select a candidate DAG from the candidate DAGs that are generated by the graph analyzer and replacer subsystem 406. To select the candidate DAG, the graph analyzer and replacer subsystem 406 can access each candidate DAG and, for each respective candidate DAG, can identify paths for traversing the respective candidate DAG and a critical path length of a critical path for the respective candidate DAG from among the identified paths. The graph analyzer and replacer subsystem 406 can then compare the critical path length for the respective candidate DAG to the other critical path lengths for the other candidate DAGs and then check whether the performance level of the respective candidate DAG is greater than performance levels of the other candidate DAGs. In some implementations, a determination can be made that the performance level of the respective candidate DAG is greater than performance levels of the other candidate DAGs by determining that the critical path length for the respective candidate DAG is less than the critical path length for the other candidate DAGs. In some implementations, a determination can be made that the performance level of the respective candidate DAG is greater than performance levels of the other candidate DAGs by determining that the critical path length for the respective candidate DAG is less than the critical path length for the other candidate DAGs by a predetermined percentage threshold (e.g., 5%, 10%, 15%, 20%, and so on). In the event the performance level of the respective candidate DAG is determined to be greater than performance levels of the other candidate DAGs, the graph analyzer and replacer subsystem 406 can set the candidate DAG having the greatest performance level as the replacement DAG and/or replacement sub-DAG. In the event that none of the candidate DAGs have a performance level that is greater than the other candidate DAGs, the graph analyzer and replacer subsystem 406 can generate additional candidate DAGs from the initial DAG with execution times other than those associated with the candidate DAGs.

In some implementations, in the case the initial DAG includes sub-DAGs representing multiple levels of activities such as the sub-DAG of higher-level activities and the one or more sub-DAGs of lower-level activities described above and the graph analyzer and replacer subsystem 406 identifies a candidate sub-DAG for a sub-DAG of the initial DAG, the graph analyzer and replacer subsystem 406 can make an additional check as to whether initial DAG with the candidate sub-DAG has a greater performance level than the initial DAG and, if the initial DAG with the candidate sub-DAG improves the performance level of the initial DAG, the graph analyzer and replacer subsystem 406 can set the candidate DAG to be a replacement sub-DAG for a sub-DAG in the initial DAG. For example, the graph analyzer and replacer subsystem 406 can determine whether the candidate sub-DAG reduces the overall critical path length of the initial DAG and replace the sub-DAG in the initial DAG with the candidate DAG. In this way, even in a case the initial DAG includes multiple level activities, performance level of the initial DAG can be improved.

As described above, once the candidate graph is set as the second graph, the graph analyzer and replacer subsystem 406 can generate updated configuration instructions. In some implementations, the graph analyzer and replacer subsystem 406 can generate updated configuration instructions by modifying the initial or first configuration instructions to include instructions for traversing the second DAG. In some implementations, in the case the second DAG includes multiple levels of activities, the graph analyzer and replacer subsystem 406 can generate the updated configuration instructions with instructions for traversing sub-DAGs of the second DAG. While foregoing techniques have been described with a respect to a DAG, the techniques described herein are equally applicable to other graphs and data structures.

Figure 6:
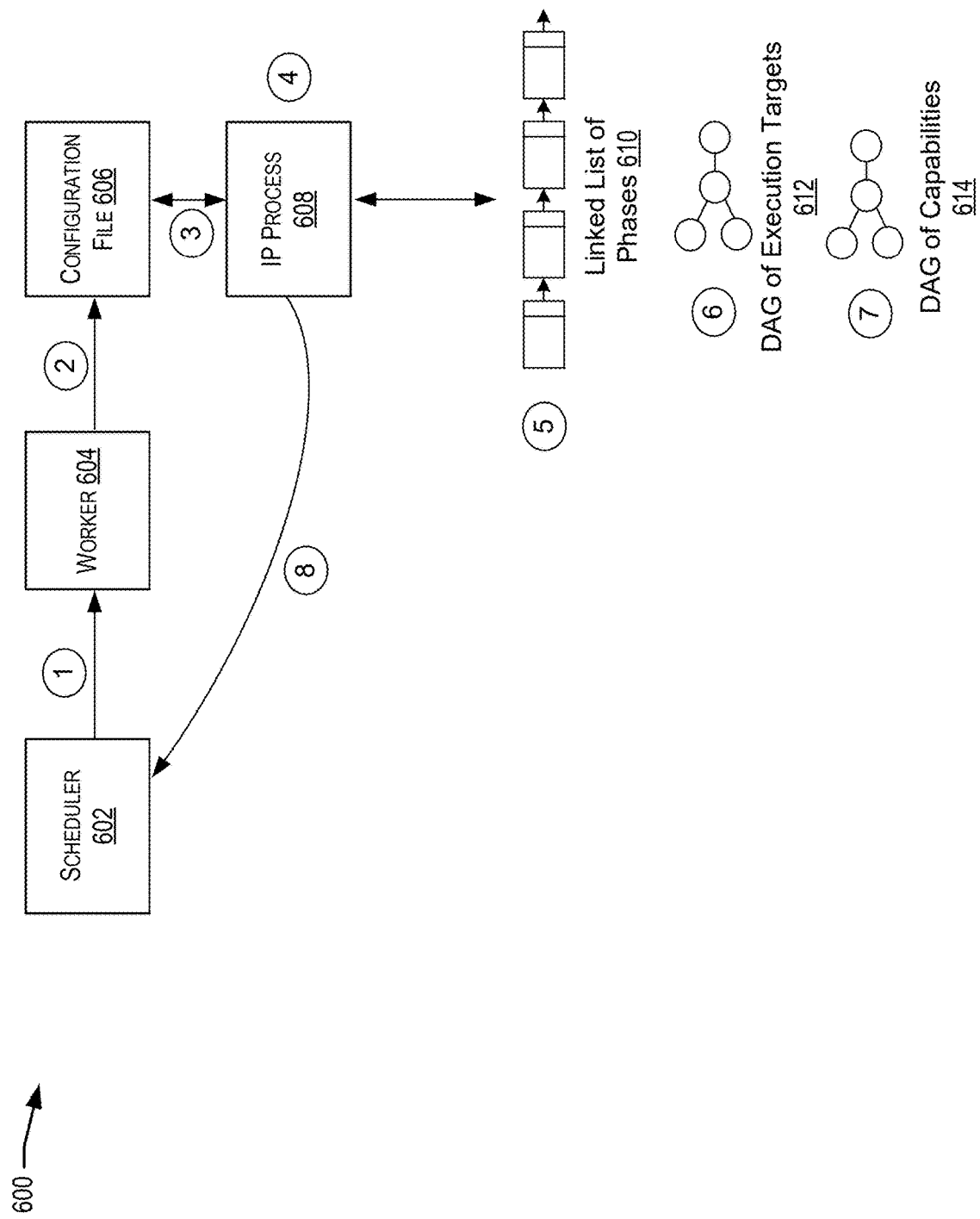
FIG. 6 is an example process flow for executing a release for building a region according to certain embodiments.

FIG. 6 is an example process flow 600 for executing a release for building a region. In some implementations, the process flow 600 can be implemented by the environment 300 and/or the multi-flock orchestrator 402. At event number one, a scheduler 602 may send a task to a worker 604. The task may include deploying a computing system or a subset thereof such as deploying infrastructure resources to a set of execution targets. The task may involve traversing a linked list, a DAG (e.g., any of the DAGS generated by MFOs 310, 402, DAG 500A, and DAG 500B), or any other suitable task for deploying the computing system. The worker 604 may receive the task from the scheduler. The worker 604 may be one worker node in a fleet of worker nodes. The fleet of worker nodes may include any suitable number of worker nodes for deploying the computing system. The worker 604 may be chosen by the scheduler 602 based, at least in part, on a capacity of the worker 604. For example, the scheduler 602 may choose to send the task to the worker 604 if the worker 604 has the most amount of computing capacity in the fleet of worker nodes.

At event number 2, the worker 604 may perform one or more parses/traversals of a configuration file 606. The configuration file 606 may include instructions for deploying the computing system, and performing the one or more parses may result in identification of resources or other capabilities that are desired to be booted or otherwise deployed for deploying the computing system.

At event number 3, information from the configuration file 606 may be transmitted to an IP Process 608. The IP Process 608 may receive information from the configuration file 606 based on the one or more parses/traversals performed by the worker 604. The information may include a set of capabilities, execution targets, or any other suitable resources for deploying the computing system.

At event number 4, in response to receiving the information from the configuration file 606, the IP Process 608 may determine an order in which capabilities or any other suitable resources for deploying the computing system are to be deployed. The IP Process 608 may generate a linked list 610, a DAG (e.g., any of the DAGS generated by MFOs 310, 402, DAG 500A, and DAG 500B) such as a DAG of execution targets 612 and a DAG of capabilities 614, or any other suitable list, graph, or data structure. The linked list 610, DAG of execution targets 612, and DAG of capabilities 66 (collectively referred to as "the release data structures") may be generated in any suitable order. The release data structures may be utilized to identify and determine an order for executing tasks of a release. For example, each node of linked list of phases 610 corresponds to a separate instance of a DAG of execution targets (e.g., an example of DAG of execution targets 612), where each node of the DAG of execution targets corresponds to a DAG of capabilities (e.g., an example of DAG of capabilities 66). IP process 608 may begin at a first node of the linked list 600, to identify a corresponding DAG of execution targets. The first node of the DAG of execution targets may be utilized to identify a corresponding DAG of capabilities. The tasks associated with that DAG of capabilities may be executed in accordance with the DAG of capabilities and upon completion, IP process 608 may traverse to the next node of the DAG of execution targets to identify the next corresponding DAG of capabilities. Each node of the DAG of execution target may be traversed and, when the tasks corresponding to those nodes are completed, IP process 608 may then traverse to the next node of linked list 600 to identify the next phase. This process may be repeated any suitable number of times until all of the tasks associated with each of the execution targets associated with the last phase of the release have been completed.

By way of example, at event number 5, a first node of the linked list of phases 610 is reached. The IP Process 608 identify a DAG of execution targets corresponding to the first node.

At event number 6, the first node of the DAG of execution targets 612 is reached. The DAG of capabilities 66 may be identified based at least in part on being associated with the first node of the DAG of execution targets 612.

At event number 7, tasks for a given execution target are executed based at least in part on traversing the DAG of capabilities 614. When those tasks have been completed, the IP process 608 may traverse to the next node of the DAG of execution targets, determine a corresponding DAG of capabilities, and execute the tasks according to traversing that DAG of capabilities. This process may proceed until the tasks associated with the last node of the DAG of execution targets 612 have been executed. The IP process 608 may then traverse to the next node of the linked list of phases 610. The operations of event number 5-7 may be repeated any suitable number of times until all of the tasks associated with all of the execution targets associated with the last node of the linked list of phases 610 have been executed.

At event number 8, the IP Process 608 transmits a signal to the scheduler 602 that traversal of the release is complete. The scheduler 602 may receive the signal from the IP Process 608 and may broadcast a notification that the computing system is ready for use.

Illustrative Methods

Figure 7A:
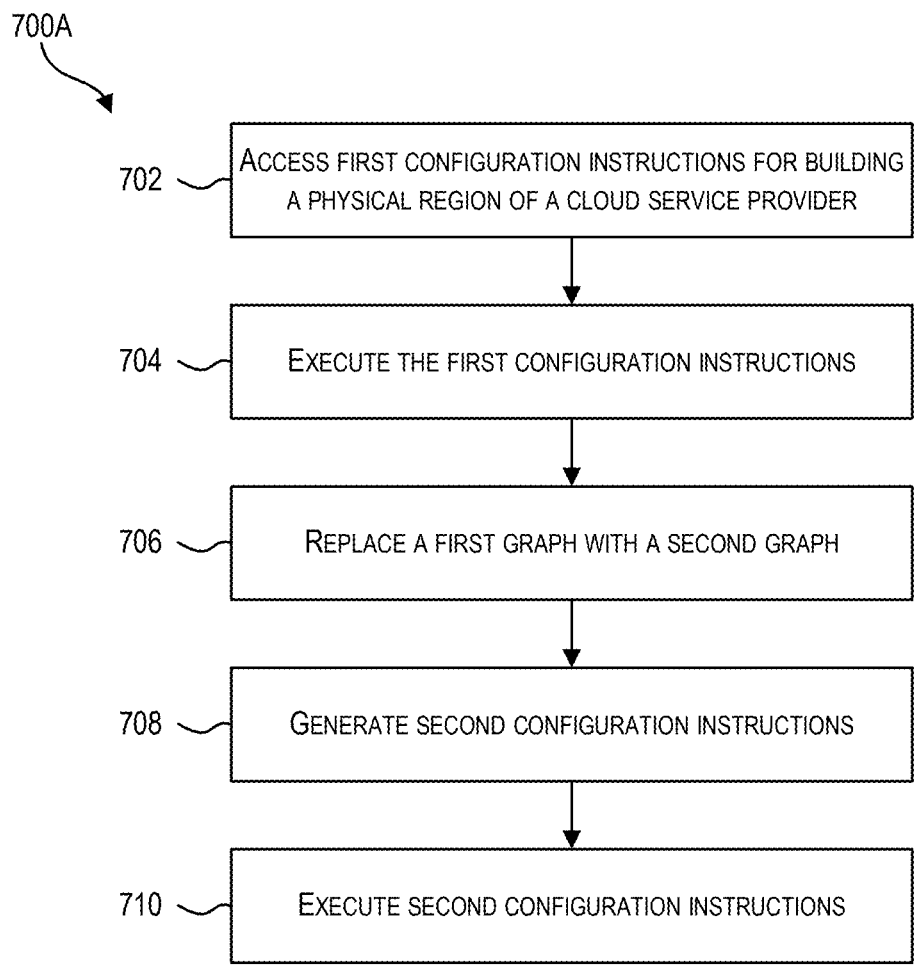
FIGS. 7A-7C illustrate examples of process flows for improving a region build process for cloud networks according to certain embodiments.
Figure 7B:
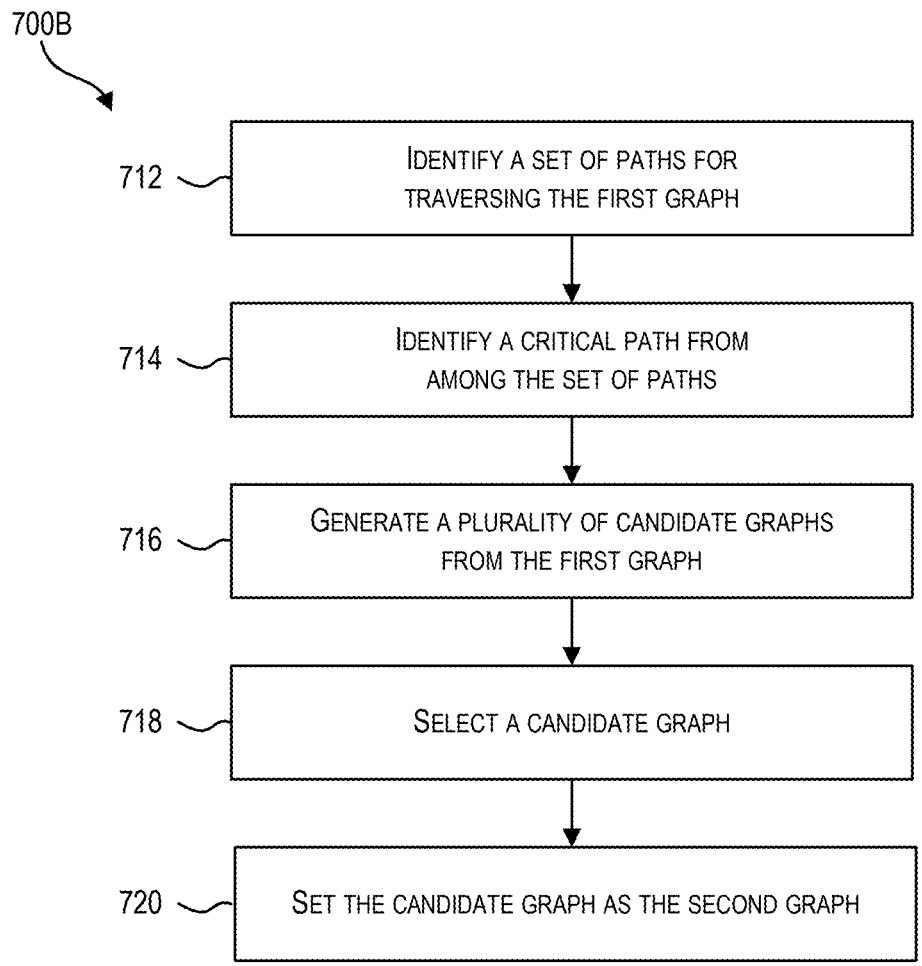
Figure 7C:
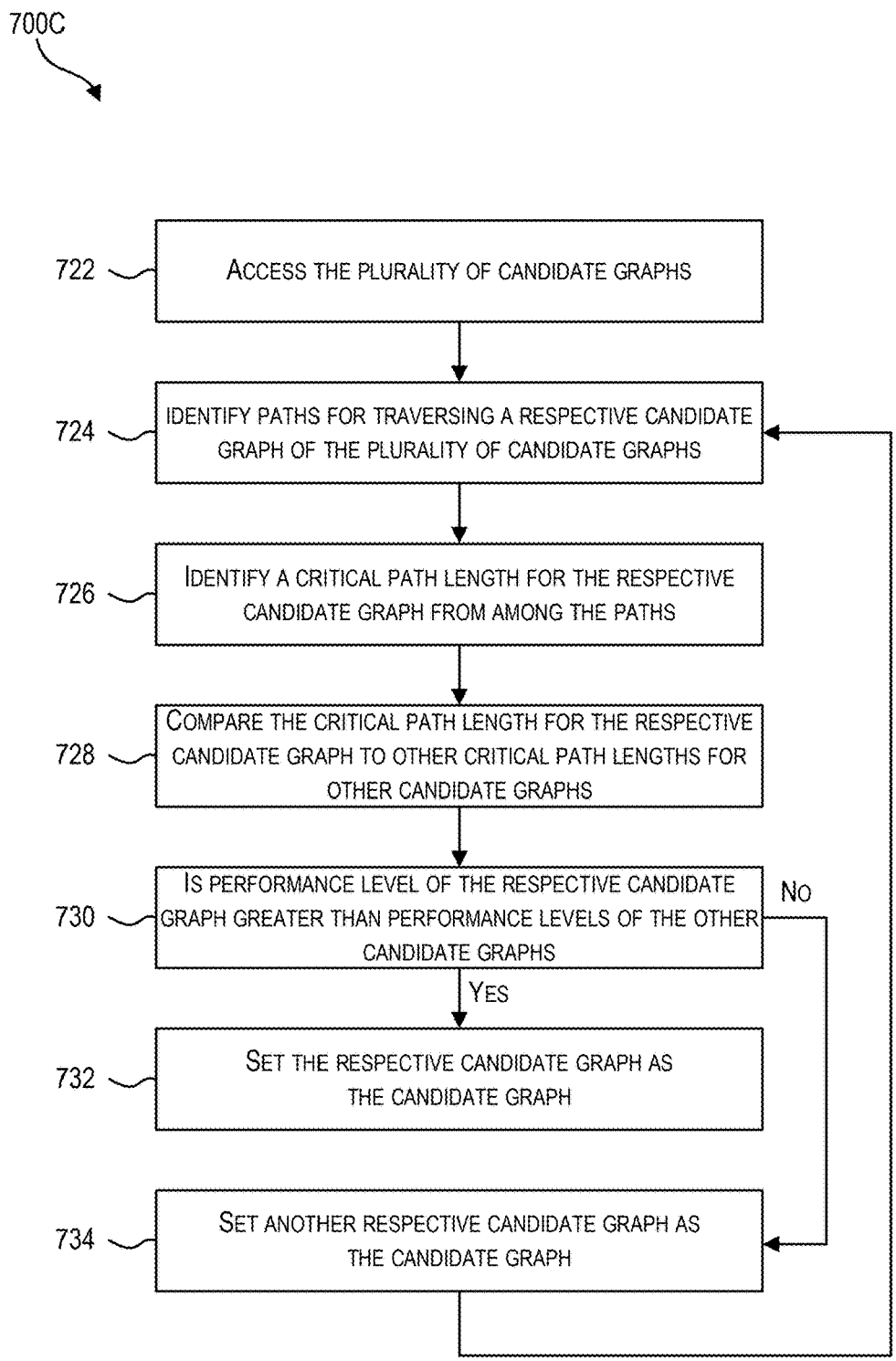

FIGS. 7A-7C illustrate examples of process flows 700A-700C for improving a region build process for cloud networks. The processing depicted in FIGS. 7A-7C may be implemented in software (e.g., code, instructions, a program) executed by one or more processing units (e.g., one or more processors, cores) of the respective systems, hardware, or combinations thereof described throughout. The software may be stored on a non-transitory storage medium (e.g., on a memory device). Although the methods presented in FIGS. 7A-7C depict the various processing steps occurring in a particular sequence or order, this is not intended to be limiting. In certain alternative embodiments, the steps may be performed in parallel and/or in a different order. In other embodiments, such as in the embodiments depicted in FIGS. 7-11, the processing depicted in FIGS. 7A-7C may be offered as a cloud service and performed by the infrastructure as a service (IaaS) architectures 800, 900, 1000, 1100.

At block 702, first configuration instructions for building a physical region of a cloud service provider are accessed. In some implementations, the first configuration instructions include instructions for traversing a first graph that includes a set of nodes. In some implementations, the first graph includes a plurality of first sub-graphs, and the first configuration instructions include instructions for traversing each first sub-graph of the plurality of first sub-graphs.

At block 704, the first configuration instructions are executed. In some implementations, executing the first configuration instructions includes traversing the first graph and/or a first sub-graph of the plurality of first sub-graphs.

At block 706, the first graph is replaced with a second graph. In some implementations, the second graph includes a plurality of second sub-graphs, wherein at least one second sub-graph of the plurality of second sub-graphs corresponds to at least one first sub-graph of the plurality of first sub-graphs. In some implementations, replacing the first graph with the second graph comprises replacing at least one sub-graph of the first graph with at least one sub-graph of the second graph. The replacement of the first graph with the second graph will now be discussed with respect to FIG. 7B.

Turning to FIG. 7B, at block 712, a set of paths for traversing the first graph are identified. In some implementations, each path of the set of paths starts at a start node of the set of nodes and ends at an end node of the set of nodes and includes a node of the set of nodes that is located between the start node and the end node.

At block 714, a critical path from among the set of paths is identified. In some implementations, the critical path represents a minimum time needed to traverse the first graph from the start node to the end node.

At block 716, a plurality of candidate graphs is generated from the first graph. In some implementations, each candidate graph of the plurality of candidate graphs includes the node. In some implementations, each respective candidate graph of the plurality of candidate graphs is generated by reducing an execution time associated with the node such that an execution time associated with the node in a respective candidate graph of the plurality of candidate graphs is different from an execution time associated with the node in other candidate graphs of the plurality of candidate graphs. In some implementations, an execution time associated with the node can be the time it takes to perform one or more region building tasks or activities that are associated with the node.

At block 718, a candidate graph is selected from the plurality of candidate graphs. The selection of a candidate graph from the plurality of candidate graphs will now be discussed respect to FIG. 7C.

Turning to FIG. 7C, at block 722, the plurality of candidate graphs is accessed.

At block, 724, paths for traversing a respective candidate graph of the plurality of candidate graphs are identified.

At block 726, a critical path length for the respective candidate graph from among the paths is identified.

At block 728, the critical path length for the respective candidate graph is compared to other critical path lengths for other candidate graphs of the plurality of candidate graphs.

At block 730, a check is made as to whether the performance level of the respective candidate graph is greater than performance levels of the other candidate graphs. In some implementations, the check that the performance level of the respective candidate graph is greater than performance levels of other candidate graphs of the plurality of candidate graphs can be made by comparing the critical path length for the respective candidate graph to other critical path lengths for the other candidate graphs and determining that the critical path length for the respective candidate graph is less than the critical path length for other candidate graphs of the plurality of candidate graphs. In some implementations, the check that the performance level of the respective candidate graph is greater than performance levels of other candidate graphs of the plurality of candidate graphs can be made by comparing the critical path length for the respective candidate graph to other critical path lengths for the other candidate graphs and determining that the critical path length for the respective candidate graph is less than the critical path length for other candidate graphs of the plurality of candidate graphs by a predetermined percentage threshold (e.g., 5%, 10%, 15%, 20%, and so on). In the event the performance level of the respective candidate graph is greater than performance levels of the other candidate graphs, the flow proceeds to block 732. In the event that the performance level of the respective candidate graph is less than the performance levels of the other candidate graphs, the flow proceeds to block 734.

At block 732, the respective candidate graph is set as the candidate graph.

At block 734, another respective candidate graph is set as the candidate graph and the flow returns block 724.

Returning to FIG. 7B, at block 720, the candidate graph is set as the second graph. In some implementations, a path length of a path for traversing the second graph is less than a path length of a path of the set of paths for traversing the first graph.

Returning to FIG. 7A, at block 708, second configuration instructions are generated. In some implementations, the second configuration instructions are generated by modifying the first configuration instructions to include instructions for traversing the second graph. In some implementations, the second configuration instructions include instructions for traversing each second sub-graph of the plurality of second sub-graphs.

At block 710, the second configuration instructions are executed. In some implementations, executing the second configuration instructions includes executing tasks associated with a plurality of sub-graphs of the second graph.

Examples Of Cloud Infrastructure

The term cloud service is generally used to refer to a service that is made available by a cloud service provider (CSP) to users (e.g., cloud service customers) on demand (e.g., via a subscription model) using systems and infrastructure (cloud infrastructure) provided by the CSP. Typically, the servers and systems that make up the CSP's infrastructure are separate from the user's own on-premise servers and systems. Users can thus avail themselves of cloud services provided by the CSP without having to purchase separate hardware and software resources for the services. Cloud services are designed to provide a subscribing user easy, scalable access to applications and computing resources without the user having to invest in procuring the infrastructure that is used for providing the services.

There are several cloud service providers that offer various types of cloud services. As discussed herein, there are various types or models of cloud services including IaaS, software as a service (SaaS), platform as a service (PaaS), and others. A user can subscribe to one or more cloud services provided by a CSP. The user can be any entity such as an individual, an organization, an enterprise, and the like. When a user subscribes to or registers for a service provided by a CSP, a tenancy or an account is created for that user. The user can then, via this account, access the subscribed-to one or more cloud resources associated with the account.

As noted above, IaaS is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need to be set up. In some instances, the provisioning can be done manually, a provisioning tool may be utilized to provision the resources, and/or deployment tools may be utilized to deploy the code once the infrastructure is provisioned.

Figure 8:
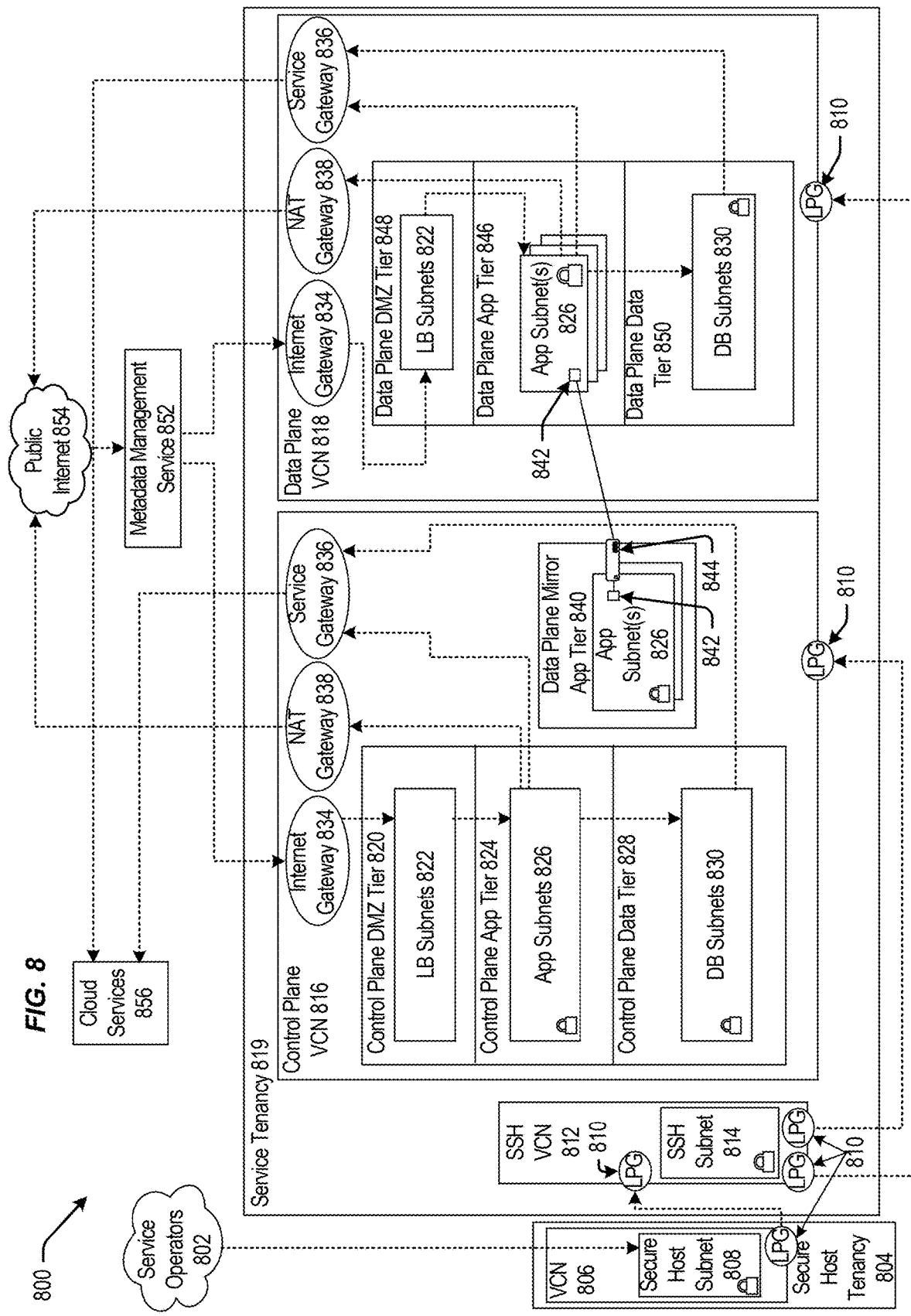
FIG. 8 is a block diagram illustrating one pattern for implementing a cloud infrastructure as a service system according to certain embodiments.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
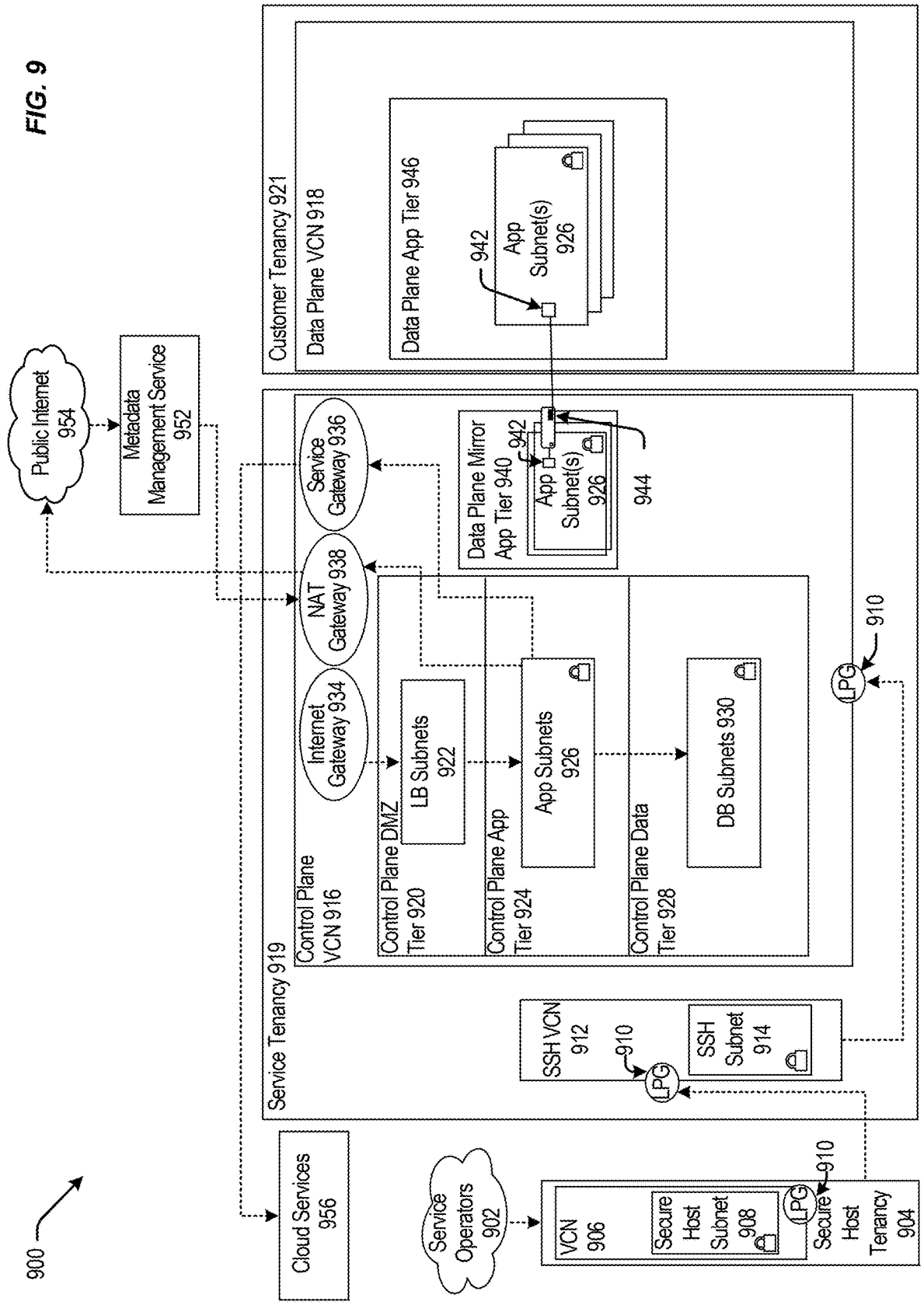
FIG. 9 is a block diagram illustrating another pattern for implementing a cloud infrastructure as a service system according to certain embodiments.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 806 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 910 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively coupled to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 7," may be located in Region 1 and in "Region 2." If a call to Deployment 7 is made by the service gateway 936 contained in the control plane VCN 916 located in Region 1, the call may be transmitted to Deployment 7 in Region 1. In this example, the control plane VCN 916, or Deployment 7 in Region 1, may not be communicatively coupled to, or otherwise in communication with, Deployment 7 in Region 2.

Figure 10:
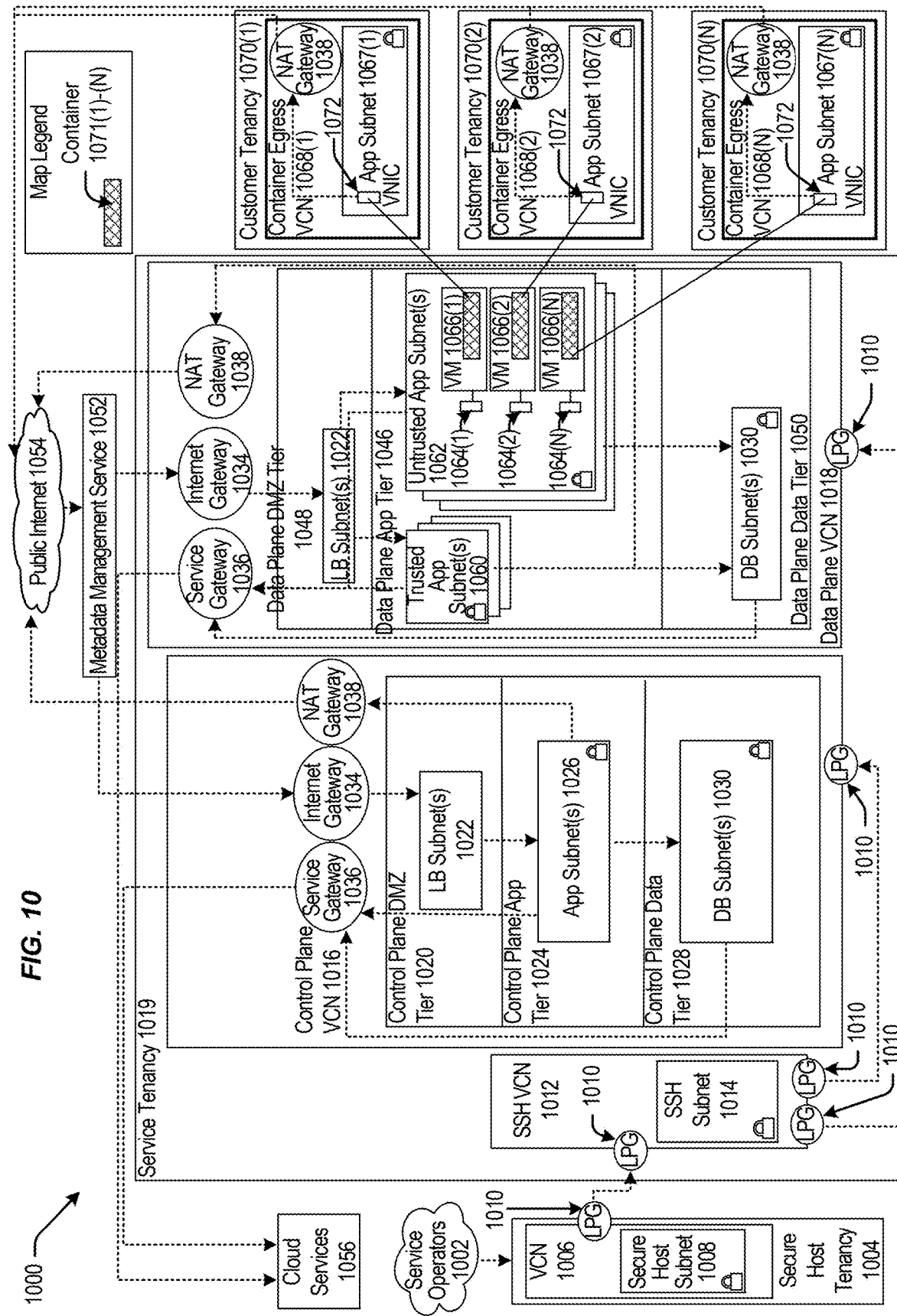
FIG. 10 is a block diagram illustrating another pattern for implementing a cloud infrastructure as a service system according to certain embodiments.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
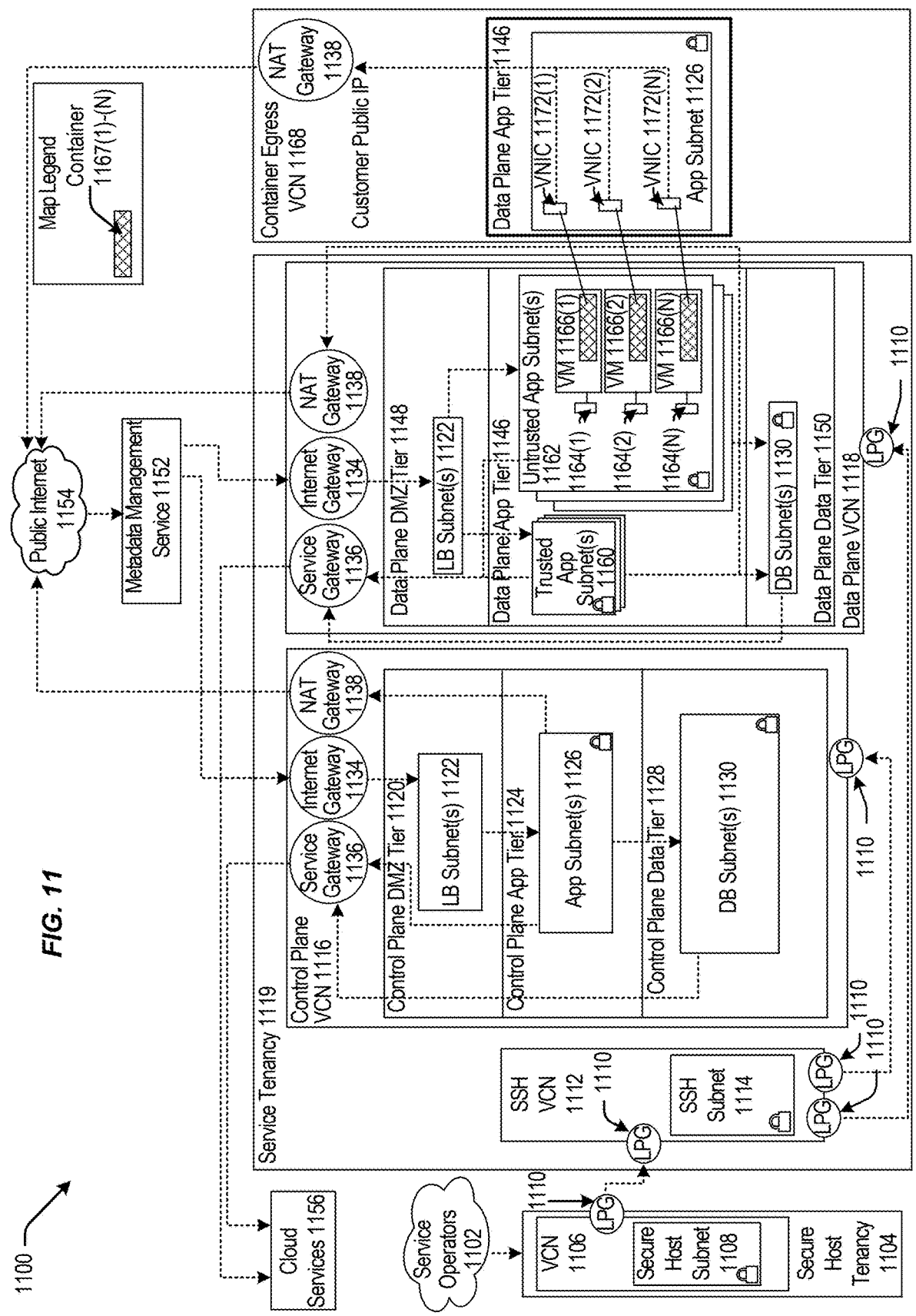
FIG. 11 is a block diagram illustrating another pattern for implementing a cloud infrastructure as a service system according to certain embodiments.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 930 of FIG. 9). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 960 of FIG. 9) and untrusted app subnet(s) 1162 (e.g., untrusted app subnet(s) 962 of FIG. 9) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
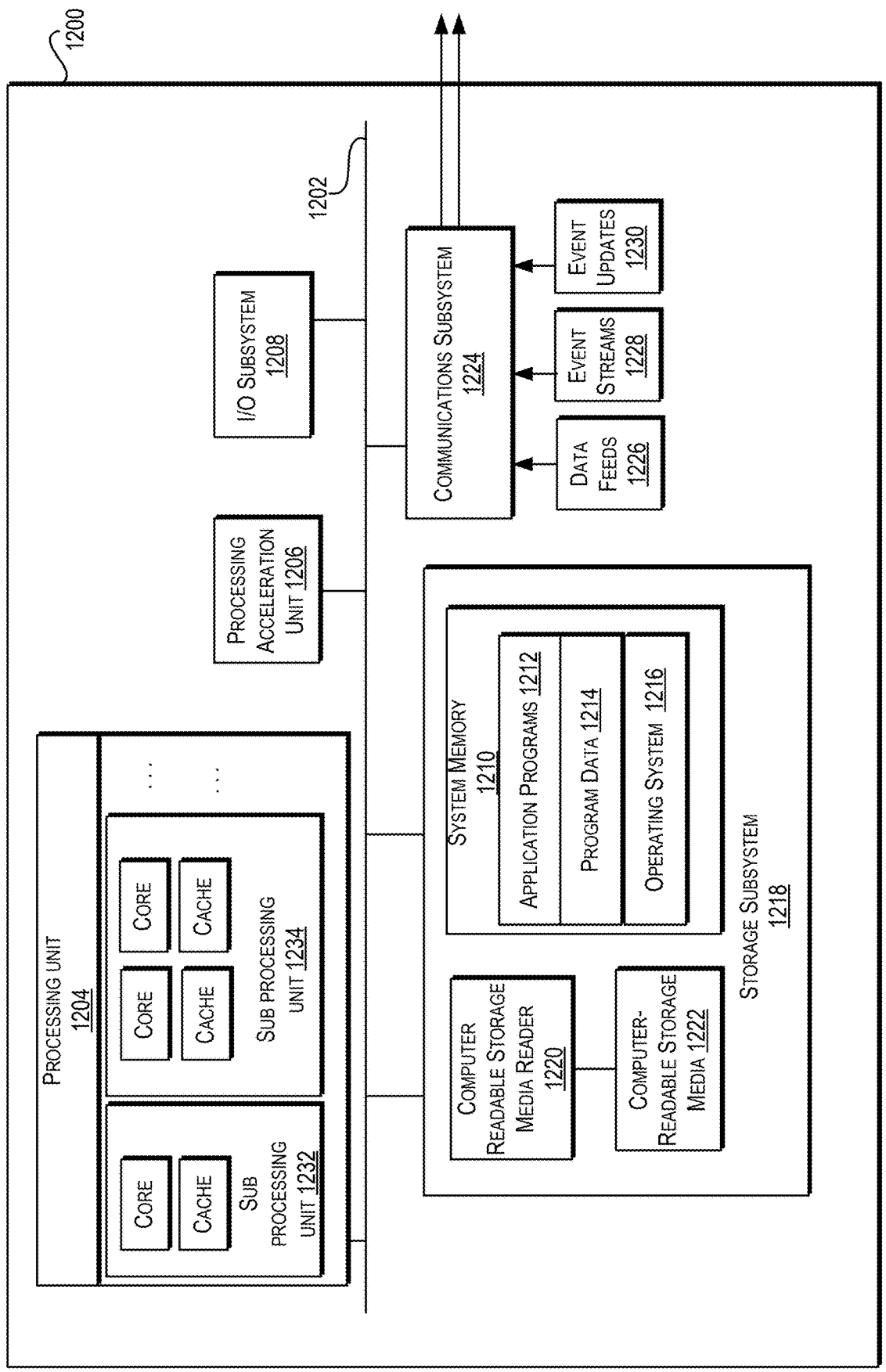
FIG. 12 is a block diagram illustrating an example computer system according to certain embodiments.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some, or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable, and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.12 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

As used herein, when an action is "based on" something, this means the action is based at least in part on at least a part of the something. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:
1. A computer-implemented method comprising:
   accessing, by a computing system, first configuration instructions for building a physical region of a cloud service provider, wherein the first configuration instructions comprise instructions for traversing a first graph comprising a set of nodes;
   executing, by the computing system, the first configuration instructions, wherein executing the first configuration instructions comprises traversing the first graph;
   replacing, by the computing system, the first graph with a second graph comprising the set of nodes by:
      identifying a set of paths for traversing the first graph, wherein each path of the set of paths starts at a start node of the set of nodes and ends at an end node of the set of nodes and includes a node of the set of nodes that is located between the start node and the end node;
      identifying a critical path from among the set of paths, the critical path representing a minimum time needed to traverse the first graph from the start node to the end node;
      generating a plurality of candidate graphs from the first graph, wherein each candidate graph of the plurality of candidate graphs includes the node, wherein an execution time associated with the node in a respective candidate graph of the plurality of candidate graphs is different from an execution time associated with the node in other candidate graphs of the plurality of candidate graphs;
      selecting a candidate graph from the plurality of candidate graphs; and
      setting the candidate graph as the second graph; and
   generating, by the computing system, second configuration instructions by modifying the first configuration instructions to include instructions for traversing the second graph.

2. The computer-implemented method of claim 1, wherein the first graph comprises a plurality of first sub-graphs, and wherein the first configuration instructions comprise instructions for traversing each first sub-graph of the plurality of first sub-graphs.

3. The computer-implemented method of claim 2, wherein the second graph comprises a plurality of second sub-graphs, wherein at least one second sub-graph of the plurality of second sub-graphs corresponds to at least one first sub-graph of the plurality of first sub-graphs, and wherein the second configuration instructions comprise instructions for traversing each second sub-graph of the plurality of second sub-graphs.

4. The computer-implemented method of claim 1, wherein the replacing the first graph with the second graph comprises replacing at least one sub-graph of the first graph with at least one sub-graph of the second graph.

5. The computer-implemented method of claim 1, wherein selecting a candidate graph from the plurality of candidate graphs comprises:
   for each respective candidate graph of the plurality of candidate graphs by:
      identifying paths for traversing the respective candidate graph;
      identifying a critical path length for the respective candidate graph based at least in-part on the paths;
      determining that a performance level of the respective candidate graph is greater than performance levels of other candidate graphs of the plurality of candidate graphs by comparing the critical path length for the respective candidate graph to other critical path lengths for the other candidate graphs; and
      setting the respective candidate graph as the candidate graph based at least in part on the determining.

6. The computer-implemented method of claim 1, wherein a path length of a path for traversing the second graph is less than a path length of a path of the set of paths for traversing the first graph.

7. The computer-implemented method of claim 1, further comprising:
   executing the second configuration instructions, wherein executing the second configuration instructions comprises executing tasks associated with a plurality of sub-graphs of the second graph.

8. A system comprising:
one or more processors; and
one or more computer-readable media storing instructions which, when executed by the one or more processors, cause the system to perform operations comprising:
   accessing first configuration instructions for building a physical region of a cloud service provider, wherein the first configuration instructions comprise instructions for traversing a first graph comprising a set of nodes;
   executing the first configuration instructions, wherein executing the first configuration instructions comprises traversing the first graph;
   replacing the first graph with a second graph comprising the set of nodes by:
      identifying a set of paths for traversing the first graph, wherein each path of the set of paths starts at a start node of the set of nodes and ends at an end node of the set of nodes and includes a node of the set of nodes that is located between the start node and the end node;
      identifying a critical path from among the set of paths, the critical path representing a minimum time needed to traverse the first graph from the start node to the end node;
      generating a plurality of candidate graphs from the first graph, wherein each candidate graph of the plurality of candidate graphs includes the node, wherein an execution time associated with the node in a respective candidate graph of the plurality of candidate graphs is different from an execution time associated with the node in other candidate graphs of the plurality of candidate graphs;
      selecting a candidate graph from the plurality of candidate graphs; and
      setting the candidate graph as the second graph; and
   generating second configuration instructions by modifying the first configuration instructions to include instructions for traversing the second graph.

9. The system of claim 8, wherein the first graph comprises a plurality of first sub-graphs, and wherein the first configuration instructions comprise instructions for traversing each first sub-graph of the plurality of first sub-graphs.

10. The system of claim 9, wherein the second graph comprises a plurality of second sub-graphs, wherein at least one second sub-graph of the plurality of second sub-graphs corresponds to at least one first sub-graph of the plurality of first sub-graphs, and wherein the second configuration instructions comprise instructions for traversing each second sub-graph of the plurality of second sub-graphs.

11. The system of claim 8, wherein the replacing the first graph with the second graph comprises replacing at least one sub-graph of the first graph with at least one sub-graph of the second graph.

12. The system of claim 8, wherein selecting a candidate graph from the plurality of candidate graphs comprises:
   for each respective candidate graph of the plurality of candidate graphs by:
      identifying paths for traversing the respective candidate graph;
      identifying a critical path length for the respective candidate graph based at least in-part on the paths;
      determining that a performance level of the respective candidate graph is greater than performance levels of other candidate graphs of the plurality of candidate graphs by comparing the critical path length for the respective candidate graph to other critical path lengths for the other candidate graphs; and
      setting the respective candidate graph as the candidate graph based at least in part on the determining.

13. The system of claim 8, wherein a path length of a path for traversing the second graph is less than a path length of a path of the set of paths for traversing the first graph.

14. The system of claim 8, the operations further comprising:
   executing the second configuration instructions, wherein executing the second configuration instructions comprises executing tasks associated with a plurality of sub-graphs of the second graph.

15. One or more non-transitory computer-readable media storing instructions which, when executed by one or more processors, cause a system to perform operations comprising:
   accessing first configuration instructions for building a physical region of a cloud service provider, wherein the first configuration instructions comprise instructions for traversing a first graph comprising a set of nodes;
   executing the first configuration instructions, wherein executing the first configuration instructions comprises traversing the first graph;
   replacing the first graph with a second graph comprising the set of nodes by:
      identifying a set of paths for traversing the first graph, wherein each path of the set of paths starts at a start node of the set of nodes and ends at an end node of the set of nodes and includes a node of the set of nodes that is located between the start node and the end node;
      identifying a critical path from among the set of paths, the critical path representing a minimum time needed to traverse the first graph from the start node to the end node;
      generating a plurality of candidate graphs from the first graph, wherein each candidate graph of the plurality of candidate graphs includes the node, wherein an execution time associated with the node in a respective candidate graph of the plurality of candidate graphs is different from an execution time associated with the node in other candidate graphs of the plurality of candidate graphs;
      selecting a candidate graph from the plurality of candidate graphs; and
      setting the candidate graph as the second graph; and
   generating second configuration instructions by modifying the first configuration instructions to include instructions for traversing the second graph.

16. The one or more non-transitory computer-readable media of claim 15, wherein the first graph comprises a plurality of first sub-graphs, and wherein the first configuration instructions comprise instructions for traversing each first sub-graph of the plurality of first sub-graphs.

17. The one or more non-transitory computer-readable media of claim 16, wherein the second graph comprises a plurality of second sub-graphs, wherein at least one second sub-graph of the plurality of second sub-graphs corresponds to at least one first sub-graph of the plurality of first sub-graphs, and wherein the second configuration instructions comprise instructions for traversing each second sub-graph of the plurality of second sub-graphs.

18. The one or more non-transitory computer-readable media of claim 15, wherein the replacing the first graph with the second graph comprises replacing at least one sub-graph of the first graph with at least one sub-graph of the second graph.

19. The one or more non-transitory computer-readable media of claim 15, wherein selecting a candidate graph from the plurality of candidate graphs comprises:
for each respective candidate graph of the plurality of candidate graphs by:
identifying paths for traversing the respective candidate graph;
identifying a critical path length for the respective candidate graph based at least in-part on the paths;
determining that a performance level of the respective candidate graph is greater than performance levels of other candidate graphs of the plurality of candidate graphs by comparing the critical path length for the respective candidate graph to other critical path lengths for the other candidate graphs; and
setting the respective candidate graph as the candidate graph based at least in part on the determining.

20. The one or more non-transitory computer-readable media of claim 15, wherein a path length of a path for traversing the second graph is less than a path length of a path of the set of paths for traversing the first graph, and the operations further comprising:
executing the second configuration instructions, wherein executing the second configuration instructions comprises executing tasks associated with a plurality of sub-graphs of the second graph.

* * * * *